United States Patent [19]
Takada et al.

[11] Patent Number: 5,905,576
[45] Date of Patent: May 18, 1999

[54] OPTICAL DISPLACEMENT MEASUREMENT DEVICE AND OPTICAL DISPLACEMENT MEASUREMENT SYSTEM

[75] Inventors: Yuji Takada, Kyoto; Hiroshi Matsuda; Takayuki Nishikawa, both of Osaka, all of Japan

[73] Assignee: Matsushita Electric Works, Ltd., Osaka, Japan

[21] Appl. No.: 08/998,550

[22] Filed: Dec. 24, 1997

[30] Foreign Application Priority Data

Dec. 24, 1996 [JP] Japan ..................................... 8-357374
Jan. 28, 1997 [JP] Japan ..................................... 9-014398

[51] Int. Cl.[6] .............................. G01B 11/14; G01C 3/06
[52] U.S. Cl. .................. 356/373; 250/206.1; 250/201.4; 250/201.6; 356/3.01; 356/4.01; 396/98; 396/106; 396/120
[58] Field of Search ..................................... 356/373, 375, 356/376, 384, 381, 3.01, 3.06, 4.01, 4.06, 4.07; 250/206.1, 206.2, 201.4, 201.6, 201.2, 559.31, 559.23, 214 AG, 214 R, 204, 222.1; 396/106, 108, 120, 98

[56] References Cited

U.S. PATENT DOCUMENTS

| | | | |
|---|---|---|---|
| 4,855,585 | 8/1989 | Nonaka | 250/206.1 |
| 5,137,350 | 8/1992 | Misawa et al. | 250/201.4 |
| 5,614,984 | 3/1997 | Seki et al. | 250/206.1 |
| 5,814,808 | 9/1998 | Takada et al. | 250/206.1 |

*Primary Examiner*—Hoa Q. Pham
*Attorney, Agent, or Firm*—Sughrue, Mion, Zinn, Macpeak & Seas, PLLC

[57] ABSTRACT

A laser diode 11 irradiates an object 3 with beam light modulated in an appropriate cycle. A position detection element 21 outputs a pair of position signals responsive to the position of a light reception spot and a processing section finds a distance to the object 3 based on the position signals. The processing section comprises a modulation control circuit 34 for irradiating the object 3 with beam light as many times as appropriate for performing distance measurement operation, then stopping the distance measurement operation and generating modulation control output indicating the operation stop, and upon reception of modulation control input indicating the operation start from the outside, again starting the distance measurement operation. Therefore, if the modulation control output of one of the two optical displacement measurement devices is directed to the modulation control input of the other, both the optical displacement measurement devices operate alternately, thus do not interfere with each other.

19 Claims, 30 Drawing Sheets

OPTICAL DISPLACEMENT MEASUREMENT DEVICE AND OPTICAL DISPLACEMENT MEASUREMENT SYSTEM

BACKGROUND OF THE INVENTION

1. Field of the Invention

This invention relates to an optical displacement measurement device and an optical displacement measurement system for irradiating an object with beam light and detecting reflected light from the object, thereby detecting the distance to the object and displacement from the reference position of the object by triangulation.

2. Related Art

Hitherto, an optical displacement measurement device has been known which irradiates an object 3 with beam light provided by passing infrared light emitted from a laser diode 11 through a light transmission lens and receiving diffused reflected light from the object 3 at a position detection element 21 through a light reception lens 22 of a light reception optical system, thereby finding the distance to the object 3 (or displacement from the reference position of the object 3) by applying the triangulation principle, as shown in FIG. 29. That is, the image of a light transmission spot formed on the surface of the object 3 by irradiating the object 3 with beam light is formed on the light reception face of the position detection element 21 through the light reception lens 22 for forming a light reception spot and as the distance to the object 3 changes, the light reception spot formation position changes, the fact of which is used to find the distance to the object 3.

The laser diode 11 is driven by a drive signal having frequency fA output by an oscillator 13 and passed through an LD drive circuit and outputs laser light modulated so that light output is changed like a sine wave.

The position detection element 21 uses a PSD (position sensitive device) placed so as to match the length direction with the light reception spot move direction or two diodes placed in the light reception spot move direction. The PSD, which is a semiconductor device having a pin structure, comprises a pair of electrodes provided at both ends of the length direction of the light reception face and a common electrode. When a light spot is formed on the light reception face, resistance between the electrodes at both ends is divided at the light spot position in response to the light spot position. That is, a constant current is supplied from the common electrode, whereby position signals 11A and 12A having a current value at the ratio responsive to the light spot position are output from the electrodes at both ends. Since the light spot position is relative to the ratio between the position signals 11A and 12A, the position of the light spot formed on the reception face of the PSD becomes a function of (11A−12A)/(11A+12A) or corrected value thereof.

The position signals 11A and 12A of electric signals output by the position detection element 21 are converted into voltage signals by I/V conversion circuits 23a and 23b and the voltage signals are amplified by amplifiers 24a and 24b, then synchronously detected by detection circuits 25a and 25b, whereby only signal components Vd1A and Vd2A are extracted. The detection circuits 25a and 25b are controlled in detection timing by a timing signal generated by a timing circuit 28 based on output of the oscillator 13. Since the signal components Vd1A and Vd2A thus extracted are like pulsation waveforms (as the laser light is modulated), position information signals V1A and V2A provided by averaging output values of the detection circuits 25a and 25b through low-pass filters 26a and 26b are found to extract the signal levels.

Since the position information signals V1A and V2A are electric signals having signal values proportional to the signal values of the position signals 11A and 12A, if an operation section 27 finds (V1A−V2A)/(V1A+V2A), information equivalent to the distance to the object 3 can be provided. That is, the operation section 27 consists of a difference calculation section 27a for finding (V1A−V2A), a sum calculation section 27b for finding (V1A+V2A), and a division section 27c for dividing the output value of the difference calculation section 27a by the output value of the sum calculation section 27b. Since (V1A+V2A) found by the sum calculation section 27b is a value equivalent to all currents of the position detection element 21 (11A+12A) and corresponds to the light reception amount, the analog output value is normalized so that light reception amount change caused by the reflection factor difference on the surface of the object 3 or the laser light strength difference produced by the laser diode 11 is not affected by the value output by the operation section 27. This means that ideally the distance to the object 3 can be found even if the light reception amount changes.

By the way, an art is proposed for placing two optical displacement measurement devices, which will be hereinafter abbreviated to displacement sensors, 1A and 1B, placed so as to face each other for measuring the distance to both faces of an object 3 to measure the thickness thereof. That is, the two displacement sensors 1A and 1B are placed so that light beams are formed in opposed directions to each other in line, and the measurement values at the displacement sensors are subtracted from the distance therebetween for finding the thickness of the object 3. In fact, to the addition value of the measurement results with the displacement sensors 1A and 1B about a reference gage having a known thickness, the thickness of the reference gage is added to generate a correction constant α, which is equivalent to the substantial distance between the two displacement sensors 1A and 1B. The sum of the distances LA and LB measured with the displacement sensors 1A and 1B for the object 3 to be measured is subtracted from the correction constant α (α−(LA+LB)), whereby the thickness of the object 3 can be found.

By the way, when the two displacement sensors 1A and 1B are used to measure the thickness of the object 3 as described above, if the object 3 is nontranslucent, the two displacement sensors 1A and 1B measure the thickness separately and no problem arises. If the object 3 is translucent, both the displacement sensors 1A and 1B interfere with each other and cannot measure the thickness with good accuracy. For example, when the object 3 is paper, ceramic, etc., beam light reaches the inside of the object 3. Thus, when the thickness is small, a part of the beam light leaks to the rear face and is received at the opposed displacement sensor 1A, 1B. Here, the beams are modulated as described above and normally a phase difference exists therebetween. Moreover, it is difficult to make the characteristics of the two displacement sensors 1A and 1B match completely. Thus, normally there is also a difference between frequencies fA and fB modulating the beams. Therefore, the length of light received at the displacement sensor 1A, 1B changes with time at the beat frequency equivalent to the difference between the frequencies fA and fB, as shown in FIG. 30. The time change amplitude changes with the ratio between the reflected light and transmitted light. The difference between frequencies fA and fB is caused for various reasons; it is also caused by circuit constant variations, temperature characteristic variations, etc. The received light amplitude and frequency cannot be determined uniquely.

Therefore, it is difficult to remove such a beat component and the beat component is contained in input to the operation section 27. That is, the position information signals V1A and V2A input to the operation section 27 (V1B and V2B to the operation section 27 of the displacement sensor 1B) change in amplitude at beat frequency, thus the denominator when the distance is found ((V1A−V2A), (V1B−V2B)) varies; resultantly, the measurement accuracy or resolution always changes with time.

Ideally, the distances match even if the light reception amount varies. In fact, the processing of the position detection section 21 to the operation section 27 contains a nonlinear portion. Thus, if the time change amplitude of the light reception amount is large, the found distance varies. Some of the member circuits may be saturated; distance measurement is made impossible or a large error occurs.

We have discussed the example wherein the beams of the two displacement sensors 1A and 1B interfere with each other to measure the thickness of the object 3. If a plurality of the displacement sensors 1A and 1B are provided in positional relationship such that they are placed with light beams interfering with each other, for example, such that the displacement sensors 1A and 1B are placed side by side and a light transmission spot is formed within the view field of the position detection element 21, there is also a possibility that interference may occur.

SUMMARY OF THE INVENTION

It is therefore an object of the invention to provide optical displacement measurement devices for measuring a distance without interfering with each other and an optical displacement measurement system using the optical displacement measurement devices.

According to the present invention, there is provided an optical displacement measurement device for irradiating an object with beam light modulated in an appropriate cycle from a light emitting element, forming a light transmission spot on the surface of the object, forming an image of the light transmission spot on a light reception face of a position detection element, thereby providing a light reception spot, and finding a distance to the object based on a position of the light reception spot by a processing section, the optical displacement measurement device comprising a modulation control circuit for irradiating the object with beam light as many times as appropriate in the cycle for performing distance measurement operation, then stopping the distance measurement operation and generating modulation control output indicating the operation stop, upon reception of modulation control input indicating the operation start from the outside, again starting the distance measurement operation.

In the present invention, the optical displacement measurement device starts to emit the beam light upon reception of the modulation control input from the outside as an instruction to start the distance measurement operation and uses output of the position detection element to find the distance to the object after the expiration of a predetermined time interval required for the started operation to become stable.

In the present invention, the number of times the beam light is emitted between reception of the distance measurement operation start instruction and stopping of the operation is set to the number of times to a degree that an average error value of distance measurement in a period during which the operation is unstable just after the operation starts can be ignored.

In the present invention, the optical displacement measurement device further includes a switch element being inserted between the position detection element and the processing section for inhibiting input of output of the position detection element to the processing section while the distance measurement operation is stopped upon reception of the modulation control input from the outside.

In the present invention, the modulation control circuit outputs either of two voltages as the modulation control output, wherein a first threshold value outside the range of the two voltages and a second threshold value within the range of the two voltages are set for comparison with the modulation control input. When the modulation control input is within the range of the two voltages with respect to the first threshold value, the modulation control circuit determines stopping or restarting of the distance measurement operation in response to greater-than or less-than relation between the second threshold value and the modulation control input, and if the modulation control input from the outside does not exist, the modulation control circuit sets opposed voltage to the two voltages with respect to the first threshold value as the modulation control input for continuing the distance measurement operation without interrupt.

In the present invention, the processing section comprises a feedback control circuit for performing feedback control of light output of the light emitting element so as to hold a light reception amount almost constant at the position detection element.

In the present invention, the position detection element outputs a pair of position signals having a signal value ratio determined in response to the light reception spot position and the processing section comprises a variable amplifier having a variable amplification factor for amplifying the position signals output from the position detection element and a feedback control circuit for performing feedback control of the amplification factor of the variable amplifier so that the addition value of output values after the paired position signals are amplified by the variable amplifier becomes almost constant.

In the present invention, the position detection element outputs a pair of position signals having a signal value ratio determined in response to the light reception spot position and the processing section comprises a variable amplifier having a variable amplification factor for amplifying the position signals output from the position detection element and a feedback control circuit for performing feedback control of light output of the light emitting element so as to hold a light reception amount almost constant at the position detection element and feedback control of the amplification factor of the variable amplifier so that the addition value of output values after the paired position signals are amplified by the variable amplifier becomes almost constant.

According to the present invention, there is provided an optical displacement measurement system using a plurality of optical displacement measurement devices classifying the optical displacement measurement devices into two groups interfering each other, and connecting modulation control inputs and modulation control outputs of the optical displacement measurement devices making up each group in common for directing modulation control output of one group to modulation control input of another group.

According to the present invention, there is provided an optical displacement measurement system using a plurality of optical displacement measurement devices, wherein the modulation control circuit starts the distance measurement operation based on either of rising and falling edges of an input signal to modulation control input from the outside and wherein the optical displacement measurement devices are connected in order like a ring so as to direct each modulation control output to each modulation control input.

In the present invention, the position detection element outputs a pair of position signals having a signal value ratio determined in response to the light reception spot position and the processing section comprises a first switch circuit for changing the position signals every cycles of an integer multiple of the beam light modulation cycle for selectively outputting either of the signals, synchronous detection means for detecting the output signal of the first switch circuit in synchronization with the beam light modulation cycle, a second switch circuit for separating an output signal of the synchronous detection means into a pair of signals in synchronization with the first switch circuit, and an operation section for calculating a displacement from a reference position of the object based on output of the second switch circuit.

In the present invention, the position detection element outputs a pair of position signals having a signal value ratio determined in response to the light reception spot position and the processing section comprises a first operation section for performing subtraction and addition operations on the position signals and outputting the resulting signals, a first switch circuit for changing the output signals of the first operation section every cycles of an integer multiple of the beam light modulation cycle for selectively outputting either of the signals, synchronous detection means for detecting the output signal of the first switch circuit in synchronization with the beam light modulation cycle, a second switch circuit for separating an output signal of the synchronous detection means into a pair of signals in synchronization with the first switch circuit, and a second operation section for calculating a displacement from a reference position of the object based on output of the second switch circuit.

In the present invention, the position detection element outputs a pair of position signals having a signal value ratio determined in response to the light reception spot position and the processing section comprises a first operation section for performing subtraction and addition operations on the position signals and outputting the resulting signals, a switch circuit for changing the output signals of the first operation section every cycles of an integer multiple of the beam light modulation cycle for selectively outputting either of the signals, synchronous detection means for detecting the output signal of the switch circuit in synchronization with the beam light modulation cycle, and a second operation section for correcting an optical nonlinear characteristic based on an output signal of the synchronous detection means and calculating a displacement from a reference position of the object.

In the present invention, the position detection element outputs a pair of position signals having a signal value ratio determined in response to the light reception spot position and the processing section comprises a first operation section for subtracting the other position signal from one position signal output from the position detection element and outputting a subtraction result signal and the other position signal, a switch circuit for changing the output signals of the first operation section every cycles of an integer multiple of the beam light modulation cycle for selectively outputting either of the signals, synchronous detection means for detecting the output signal of the switch circuit in synchronization with the beam light modulation cycle, and a second operation section for correcting an optical nonlinear characteristic based on an output signal of the synchronous detection means and calculating a displacement from a reference position of the object.

In the present invention, the position detection element outputs a pair of position signals having a signal value ratio determined in response to the light reception spot position and the processing section comprises a first operation section for subtracting the other position signal from one position signal output from the position detection element and outputting a subtraction result signal and the one position signal, a switch circuit for changing the output signals of the first operation section every cycles of an integer multiple of the beam light modulation cycle for selectively outputting either of the signals, synchronous detection means for detecting the output signal of the switch circuit in synchronization with the beam light modulation cycle, and a second operation section for correcting an optical nonlinear characteristic based on an output signal of the synchronous detection means and calculating a displacement from a reference position of the object.

BRIEF DESCRIPTION OF THE DRAWINGS

In the accompanying drawings:

FIGS. 15 (b) to (d) are another embodiments of the ninth embodiment of the present invention;

DETAILED DESCRIPTION OF THE PREFERRED EMBODIMENTS

First Embodiment

Figure 1:
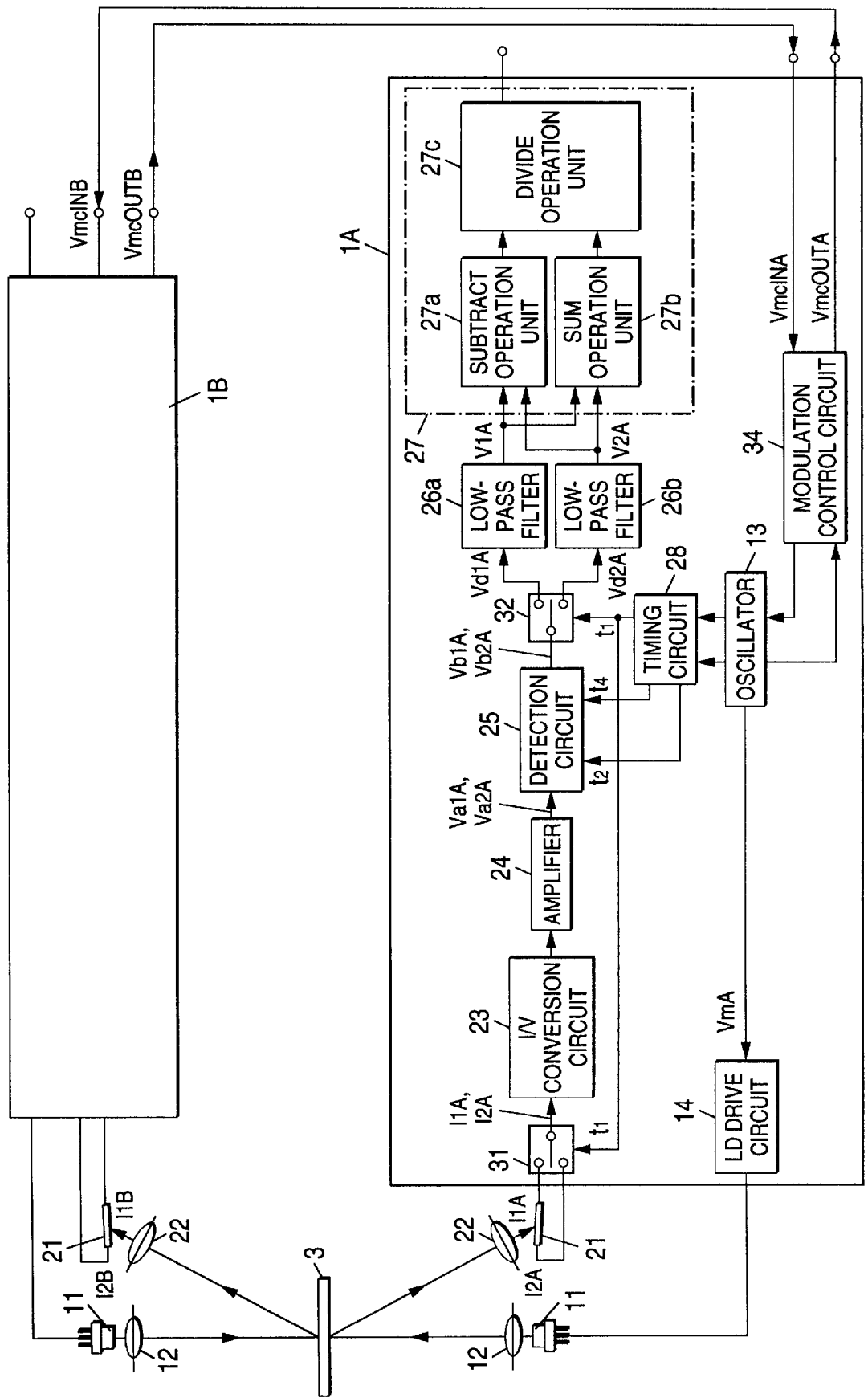
FIG. 1 is a block diagram to show a first embodiment of the invention.

FIG. 1 shows the configuration of a first embodiment of the invention. In the embodiment, two displacement sensors 1A and 1B are placed so that beams are formed in line and in opposed directions to each other for measuring the thickness of an object 3. The displacement sensors 1A and 1B have the same configuration. First, the configuration of the displacement sensor 1A, 1B will be discussed.

Beam light applied to an object 3 is provided by passing infrared light emitted from a laser diode 11 through a light transmission lens 12 as in the conventional configuration. The laser diode 11 is driven by a drive signal having frequency fA provided by passing output of an oscillator 13 through an LD drive circuit 14. This means that laser light modulated so that light output changes like a sine wave is output as in the conventional configuration.

On the other hand, the image of a light transmission spot formed on the surface of the object 3 by irradiating the object 3 with the beam light is formed on the light reception face of a position detection element 21 made of a PSD through a light reception lens 22, and two position signals 11A and 12A are output from the position detection element 21 in response to the position of a light reception spot formed on the light reception face of the position detection element 21. Since the ratio between the output values of both the position signals 11A and 12A is determined in response to the position of the light reception spot, a displacement from the reference position of the object 3 can be found based on the signal values of the position signals 11A and 12A. Here, the reference position is the position of the object 3 on an extension of the beam light when the light reception spot is formed at the center of the effective length of the light reception face of the position detection element 21 and change of the distance of the object 3 from the reference position is found as the displacement. However, the center position of the light transmission lens 12 is preset as the reference position and the distance to the object 3 may be found.

In the embodiment, switch circuits 31 and 32 are provided preceding and following a circuit (formerly requiring two channels) for processing signals on two channels in a time division manner, whereby the signals can be processed by 1-channel circuitry. That is, the position signals 11A and 12A output from the position detection element 21 input to an I/V conversion circuit 23 alternatively through the switch circuit 31. In fact, the position signal 11A, 12A is a sine wave signal containing a DC component produced by disturbance light, etc., (namely, a sine wave signal shifted in center due to the DC component). However, in the description to follow, the DC component is ignored. The light reception spot position corresponds to the amplitude ratio between the sine wave signals. Which of the position signals 11A and 11B is input to the I/V conversion circuit 23 is determined under the control of a switch signal t1 output from a timing circuit 28. As seen from the comparison between FIG. 2 (f) and (i), the on duration of the switch signal t1 is set to twice that of a timing signal t2 described later.

Output of the I/V conversion circuit 23 is input to an amplifier 24, which then amplifies it at an appropriate amplification factor. An output signal of the amplifier 24, Va1A, Va2A, is equivalent to a signal connecting the position signal 11A, 12A at the switch timing of the switch circuit 31. The output signal Va1A, Va2A is synchronously detected by a detection circuit 25 inverting the input signal every half modulation cycle of beam light emitted from the laser diode 11, whereby a signal component Vb1A, Vb2A is extracted.

Figure 2:
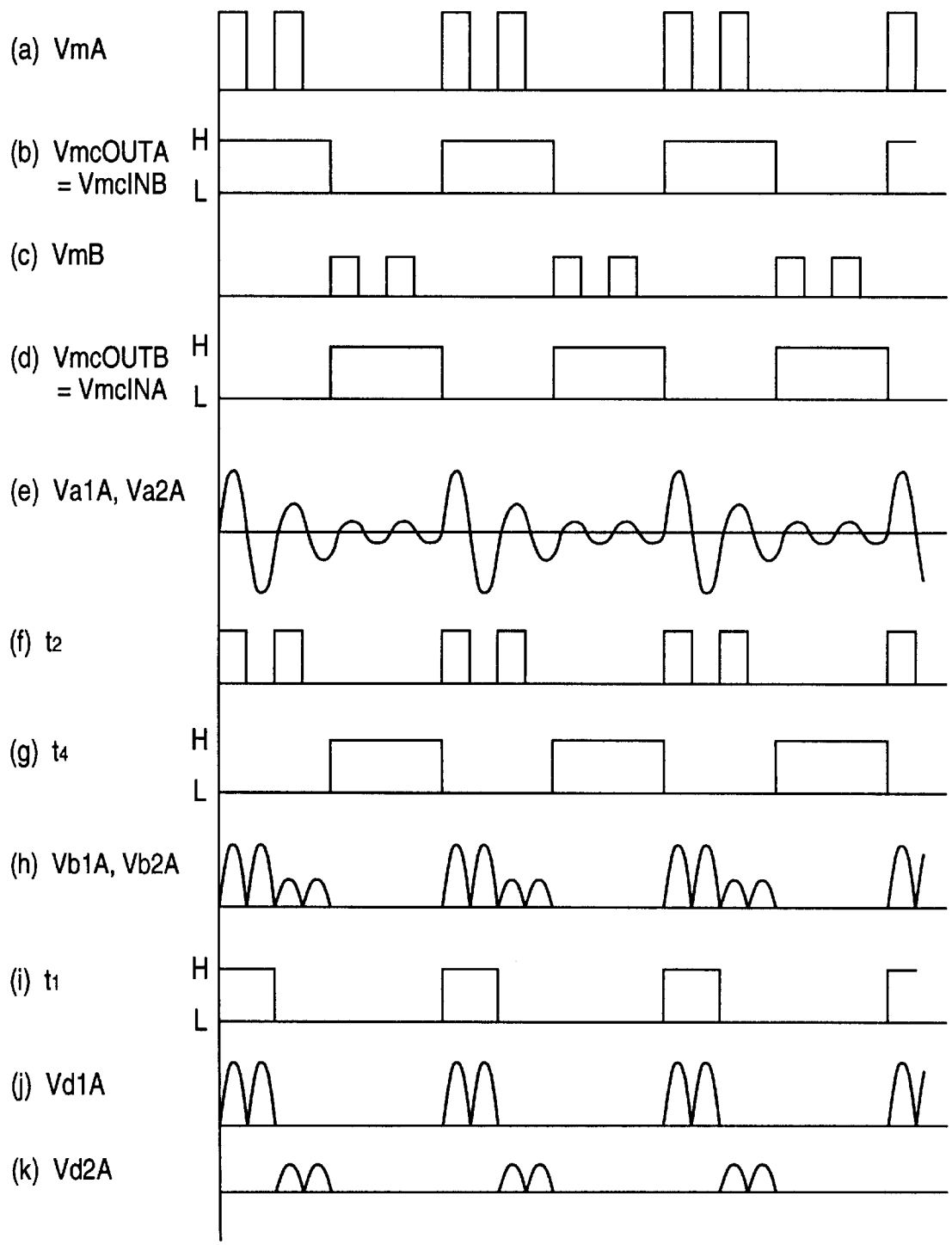
FIGS. 2 (a) to (k) are illustrations to explain the operation of the first embodiment of the invention.

The detection circuit 25 detects the input signal in synchronization with a timing signal t2 from the timing circuit 28 (see FIG. 2 (f)). When the timing signal t2 is high, the detection circuit 25 takes out the amplifier 24 output signal Va1A, Va2A intact. When the timing signal t2 is low, the detection circuit 25 inverts the polarity of the amplifier 24 output signal Va1A, Va2A and takes out the resultant signal. The signal component Vb1A, Vb2A is separated into a pair of signal components Vd1A and Vd2A like pulsation waveforms corresponding to the position signals 11A and 12A by the switch circuit 32 controlled by the switch signal t1 so as to synchronize with the switch circuit 31.

The signal components Vd1A and Vd2A provided by the switch circuit 32 are input to low-pass filters 26a and 26b and DC components are taken out. Position information signals V1A and V2A output through the low-pass filters 26a and 26b are input to a difference calculation section 27a, which then provides a signal equivalent to the difference between the signal values of the position signals 11A and 12A. The position information signals V1A and V2A are also input to a sum calculation section 27b, which then provides a signal equivalent to the sum of the signal values of the position signals 11A and 12A. The position information signals output by the difference calculation section 27a and the sum calculation section 27b are input to a division section 27c, which then divides the output value of the difference calculation section 27a by the output value of the sum calculation section 27b and outputs the result to an external system as a signal equivalent to the distance to the object 3.

In the configuration, the position signals output from the position detection element 21 are processed alternately in a time division manner in synchronization with the beam light modulation cycle and the I/V conversion circuit 23, the amplifier 24, and the detection circuit 25 are shared. Thus, an error caused by constant variations or temperature characteristic variations of the components as 2-channel circuitry is used does not occur and moreover the two position signals 11A and 12A are synchronously detected by the single detection circuit 25, so that an offset error does not occur. Further, an offset error occurring at the stage preceding the detection circuit 25 is passed through the detection circuit 25, whereby it can be canceled. A slight offset error occurring in the detection circuit 25 can be removed by a correction circuit having a comparatively simple configuration because of 1-channel circuitry. Further, since the two position signals 11A and 12A are processed by the same circuitry, a frequency characteristic difference is not produced until the signals are separated by the switch circuit 32; even if change occurs in the modulation frequency of the signal driving the laser diode 11, a transient error does not occur in the distance measurement result.

By the way, the invention is characterized by the fact that the displacement sensor 1A, 1B is provided with a modulation control circuit 34. Upon reception of modulation control input VmcINA (in the embodiment, when VmcINA is high), the modulation control circuit 34 stops the operation of the oscillator 13. If modulation control input VmcINA does not exist, the modulation control circuit 34 operates the oscillator 13 and outputs modulation control output VmcOUTA (in the embodiment, sets VmcOUTA high). If the operation of the oscillator 13 stops, the detection circuit 25 also stops the operation.

The description made so far applies to the displacement sensor 1A; the displacement sensor 1B also the same configuration and the modulation control circuits 34 of the displacement sensors 1A and 1B are connected to each other so that the modulation control output VmcOUT of one displacement sensor becomes the modulation control input VmcINB of the other displacement sensor. Therefore, while one displacement sensor 1A (1B) is operating, the other displacement sensor 1B (1A) neither generates nor detects beam light; both the displacement sensors 1A and 1B operate independently of each other in a time division manner. This means that the two displacement sensors 1A and 1B do not interfere with each other.

The operation timing of the configuration will be discussed with reference to FIG. 2. FIG. 2 (a) is output VmA of the oscillator 13 of the displacement sensor 1A; FIG. 2 (b) is modulation control output VmcOUTA of the displacement sensor 1A, namely, modulation control input VmcINB of the displacement sensor 1B; FIG. 2 (c) is output VmB of the oscillator 13 of the displacement sensor 1B; and FIG. 2 (d) is modulation control output VmcOUTB of the displacement sensor 1B, namely, modulation control input VmcINA of the displacement sensor 1A. As seen from the relationships, while the oscillator 13 of one displacement sensor 1A (1B) operates for causing the laser diode 11 to emit light, light emission is stopped in the other displacement sensor 1B (1A) (when the signals in FIG. 2 (b) and (d) are high, the operation is performed), preventing the laser diodes 11 of both the displacement sensors 1A and 1B from emitting light at the same time to suppress beam light interference.

The position detection element 21 receives light from both the displacement sensors 1A and 1B. Thus, in the displacement sensor 1A, the output signals Va1A and Va2A are provided from the amplifier 24 as in FIG. 2 (e) even while the operation of the oscillator 13 stops. However, while the oscillator 13 of the diplacement sensor 1A stops as in FIG. 2 (f) and (g), the operation of the detection circuit 25 is also stopped (when the signal in FIG. 2 (g) is high, the operation is stopped), thereby preventing the distance from being found by light of the other displacement sensor 1A (1B). That is, the output of the detection circuit 25 of the displacement sensor 1A becomes as shown in FIG. 2 (h) and becomes 0 V during the operation of the displacement sensor 1B, so that the effect of the operation of the other displacement sensor 1B can be removed. FIG. 2 (i) shows the timing signal t1 for switching the switch circuit 32. The signal components Vd1A and Vd2A are separated as in FIG. 2 (j) and (k) by the switch circuit 32. The processing after the separation becomes similar to that in the conventional example.

As we have discussed, the two displacement sensors 1A and 1B operate alternately, whereby they can measure the distance without interfering with each other. In the embodiment, the displacement sensors 1A and 1B for executing distance measurement are switched every two light emission cycles of the laser diode 11, but the cycles are not limited.

In the conventional configuration, the two I/V conversion circuits 23a and 23b, the two amplifiers 24a and 24b, and the two detection circuits 25a and 25b are provided for the position signals 11A and 12A output from the position detection element 21; in the embodiment, the I/V conversion circuit 23, the amplifier 24, and the detection circuit 25 are provided only as one channel and the signals are switched by the switch circuits 31 and 32. The displacement sensors 1A and 1B are configured as in the embodiment, whereby the position signals 11A and 12A are also processed with the same characteristic in the transient period in which output of the oscillator 13 of each displacement sensor 1A, 1B is stopped or started, so that an error is not produced in distance measurement. In the state of the art, it is difficult to complete the circuits for processing both the position signals 11A and 12A in responsivity in the conventional configuration.

Even if perfect adjustments and corrections are made, the circuits will differ in responsivity due to temperature change or change with time. If the conventional configuration is adopted, a measurement error is not avoided. In contrast, if the configuration of the embodiment is adopted, this kind of measurement error does not occur in principle, so that measurement accuracy is enhanced.

Second Embodiment

Figure 3:
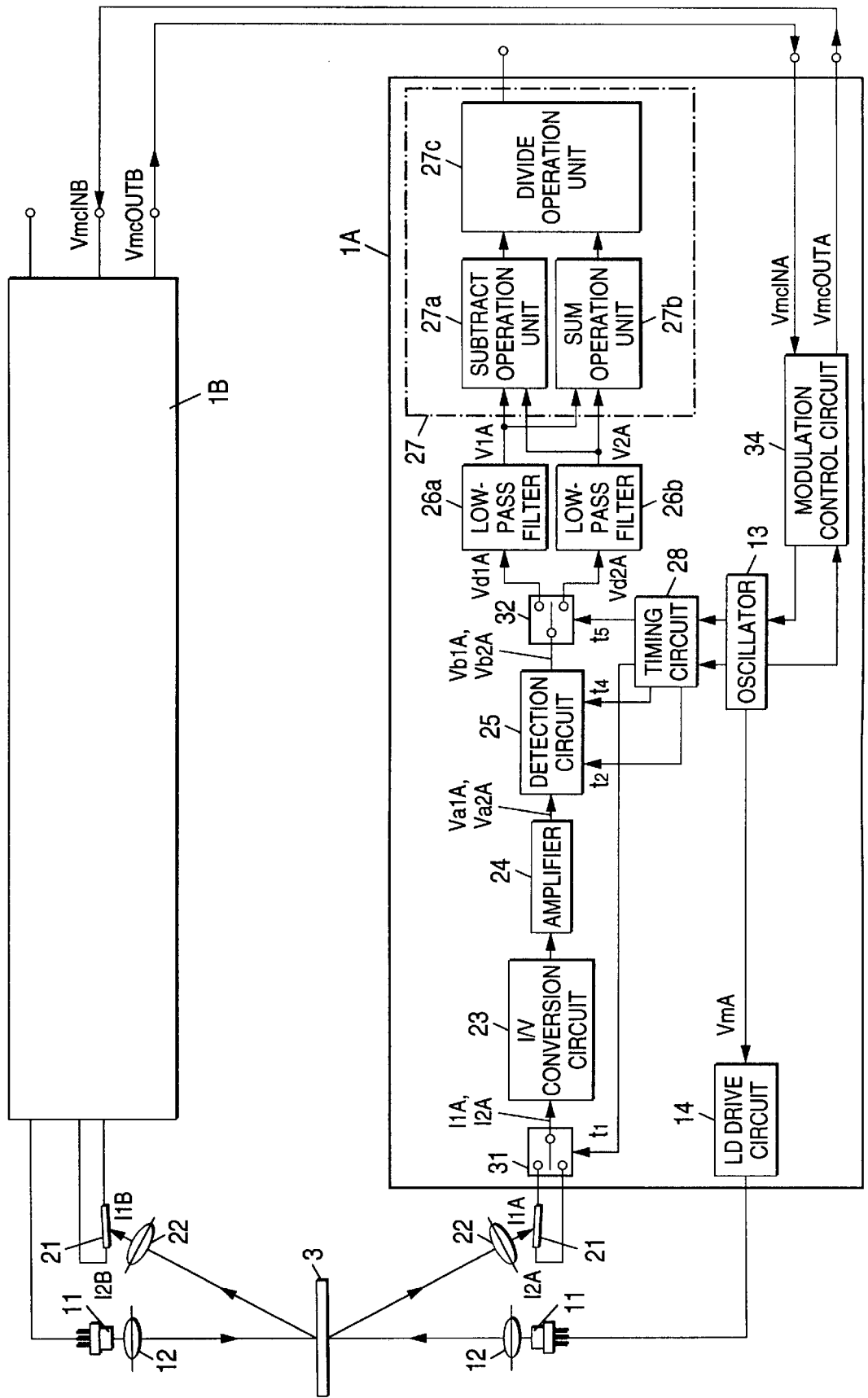
FIG. 3 is a block diagram to show a second embodiment of the invention.

In a second embodiment of the invention, switch circuits 31 and 32 are controlled by using different switch timing signals t1 and t5, as shown in FIG. 3. As seen from the comparison between FIGS. 2 and 4, timing signals t2 and t4 given to a detection circuit 25 are also made different from those in the first embodiment.

That is, in the configuration of the first embodiment, measurement is started just after the operation of the displacement sensor 1A, 1B is switched by the modulation control circuit 34. Thus, signal processing may be delayed and waveform distortion may occur depending on the response of the displacement sensor 1A, 1B. Resultantly, an error may occur in the distance measurement accuracy. Then, in the embodiment, distance measurement is not executed until beam light and the processing circuitry operation become stable after displacement sensor 1A, 1B is switched.

Figure 4:
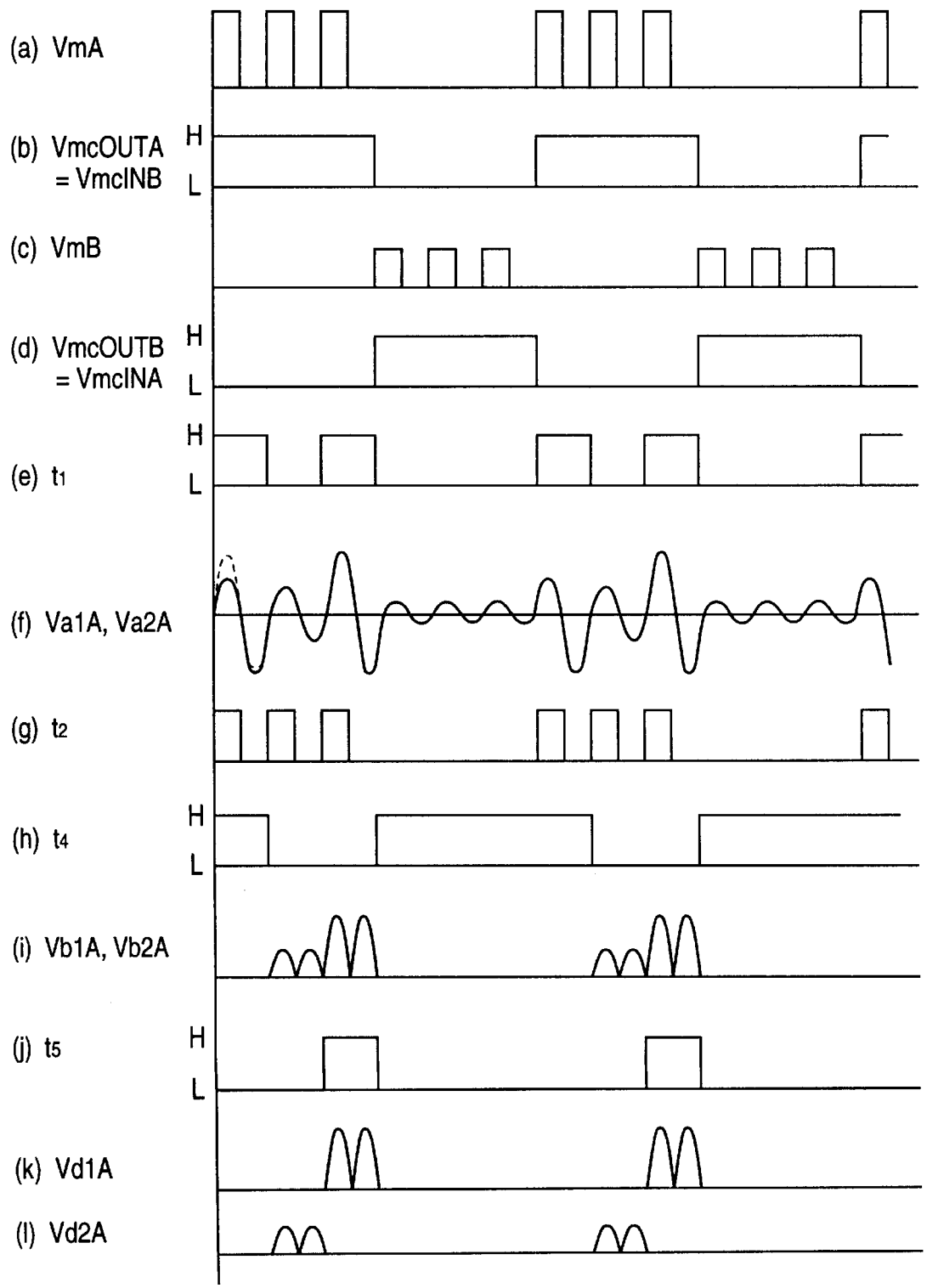
FIGS. 4 (a) to (l) are illustrations to explain the operation of the second embodiment of the invention.

FIG. 4 shows an example wherein the operation of the displacement sensor 1A, 1B becomes stable in one cycle of output VmA, VmB of an oscillator 13. That is, just after the displacement sensor 1A, 1B is switched, the waveform should become a waveform as indicated by the phantom line, but becomes a waveform as indicated by the solid line, as shown in FIG. 4 (f). Then, beam light emission is started just after the switching as in FIG. 4 (a) and the timing signal t2 is given to the detection circuit 25 as in FIG. 4 (h), but output of the detection circuit 25 is inhibited as in FIG. 4 (h). In association with the operation, the switch signals t1 and t5 used for switching of switch circuits 31 and 32 become as shown in FIG. 4 (e) and (j) respectively, output of the detection circuit 25 becomes as shown in FIG. 4 (i), and output of the switch circuit 32 becomes as shown in FIG. 4

(*k*) and (*l*). In short, the second embodiment differs from the first embodiment only in that output of the detection circuit 25 is not taken out until the operation becomes stable after the displacement sensor 1A, 1B is switched and that the switch timings of the switch circuits 31 and 32 are also changed accordingly.

The configuration enables distance measurement after the operation becomes stable; the measurement accuracy is furthermore enhanced.

Third Embodiment

Figure 5:
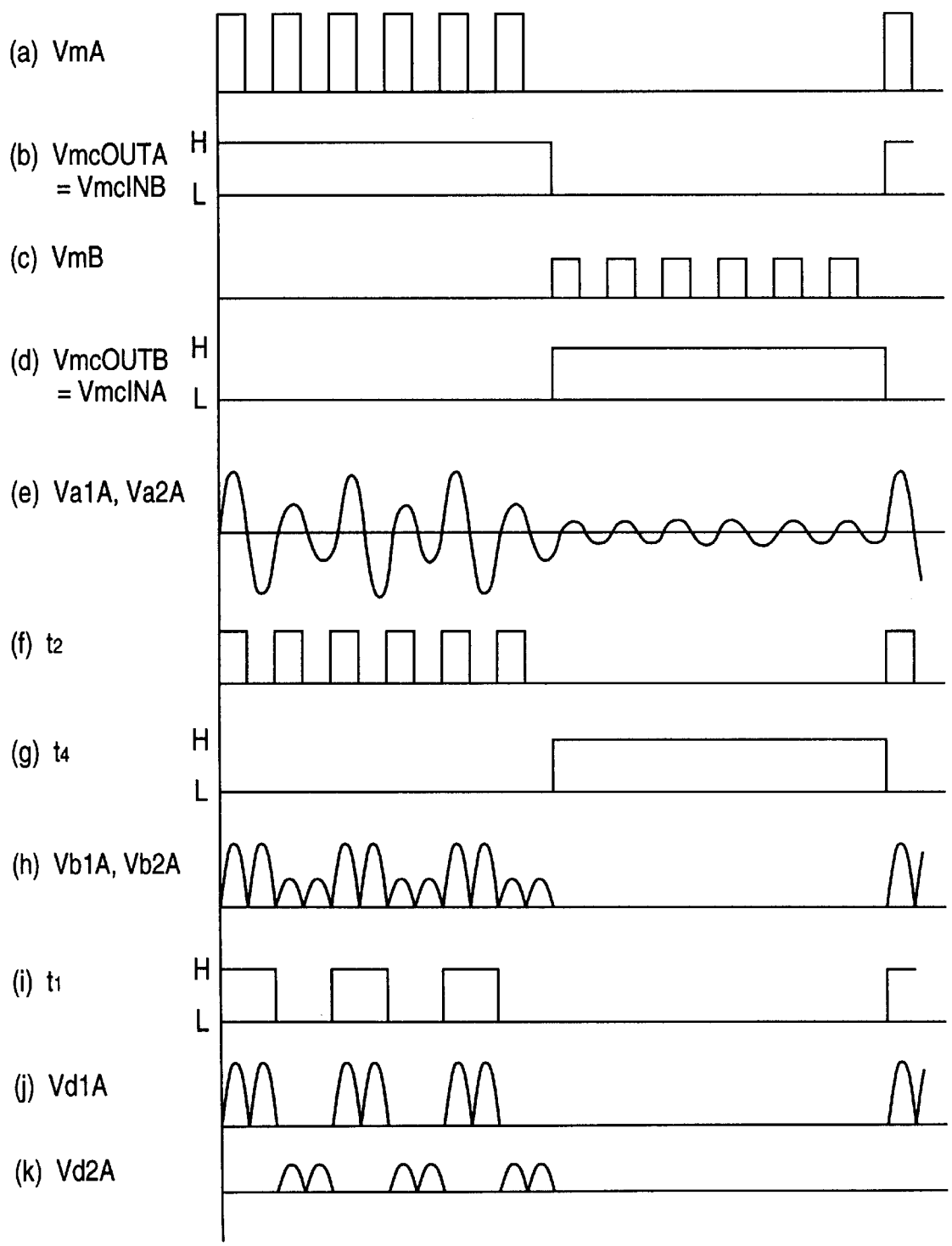
FIGS. 5 (a) to (k) are illustrations to explain the operation of a third embodiment of the invention.

In a third embodiment of the invention, timing signals t2 and t4 in the circuit configuration of the first embodiment are changed, as shown in FIG. 5. That is, in the first embodiment, the laser diode 11 is made to emit light twice each time the operation of the displacement sensor 1A, 1B is changed; in the third embodiment, a laser diode 11 is made to emit light six times each time the operation of displacement sensor 1A, 1B is changed. The number of light emission times is not limited to six. The number of times is selected to the degree to which a measurement value error just after the operation of the displacement sensor 1A, 1B is changed can be ignored for an average value of measurement values found by emitting light more than once. If the distances found by emitting light more than once are integrated, etc., for finding a value equivalent to the average value, error percentage can be decreased.

Like the first embodiment, the third embodiment provides countermeasures against occurrence of an error in the measurement value just after the operation of the displacement sensor 1A, 1B is changed. However, the need for discarding the measurement values found while the operation is unstable as in the second embodiment is eliminated in the third embodiment, so that the timings in the third embodiment are simpler than those in the second embodiment. In the first embodiment, light is emitted twice each time the operation of the displacement sensor 1A, 1B is changed; in the third embodiment, light is emitted 2 N times (where N is 2 or more) each time the operation of displacement sensor 1A, 1B is changed. Other components and operation of the third embodiment are similar to those of the first embodiment.

Fourth Embodiment

Figure 6:
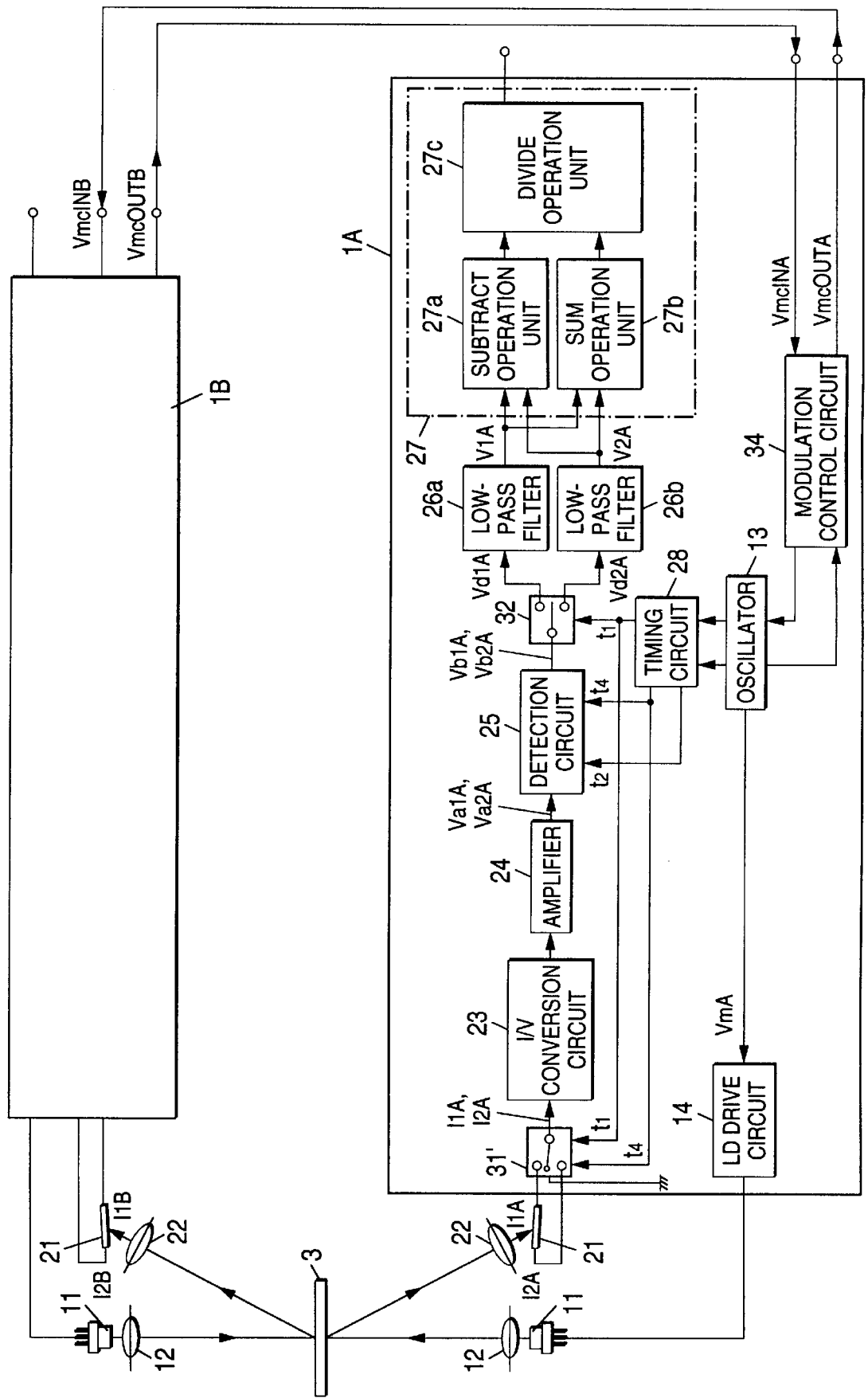
FIG. 6 is a block diagram to show a fourth embodiment of the invention.
Figure 7:
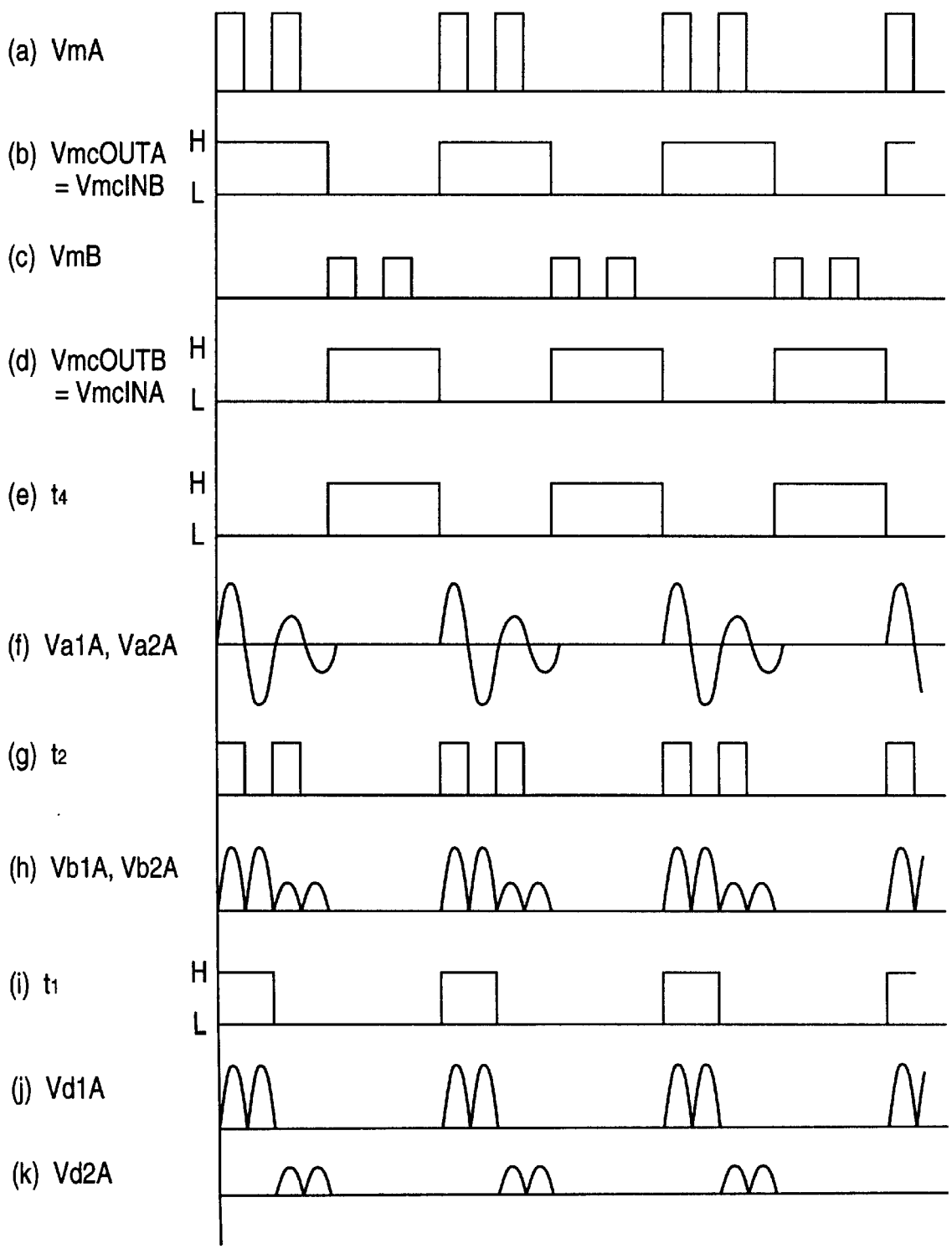
FIGS. 7 (a) to (k) are illustrations to explain the operation of the fourth embodiment of the invention.

A fourth embodiment of the invention differs from the first embodiment in that the switch circuit 31 in the first embodiment always inputs either of the position signals 11A and 12A output from the position detection element 21 to the I/V conversion circuit 23; whereas the fourth embodiment uses a switch circuit 31' having a mode of inputting neither of the position signals 11A and 12A to an I/V conversion circuit 23, as shown in FIG. 6. In short, in the first embodiment, output of the detection circuit 25 is stopped during the operation of the associated displacement sensor 1A, 1B; in the fourth embodiment, input from a position detection element 21 to the I/V conversion circuit 23 is inhibited during the operation of the associated displacement sensor 1A, 1B. This means that the switch circuit 31' taking three positions is controlled by using a timing signal t4 as well as a switch signal t1, as shown in FIG. 7.

According to the configuration of the fourth embodiment, even if the position detection element 21 receives disturbance light having a drastically larger light amount than the normally received light amount, the light can be prevented from being incident on the I/V conversion circuit 23. If output of the position detection element 21 is abnormally large, the I/V conversion circuit 23 and an amplifier 24 are saturated or cannot be used in a linear region. Resultantly, waveform distortion occurs in output of a detection circuit 25. In the fourth embodiment, however, position signals 11A and 11B generated based on disturbance light are not input to the I/V conversion circuit 23 during the operation of the other displacement sensor 1A, 1B, thus the possibility that the situation as described above can be avoided is raised. Resultantly, the reliability of the measurement result is enhanced. The configuration of the fourth embodiment is effective particularly when light output of the other displacement sensor 1A, 1B is large. Other components and operation of the fourth embodiment are similar to those of the first embodiment.

Fifth Embodiment

Figure 8:
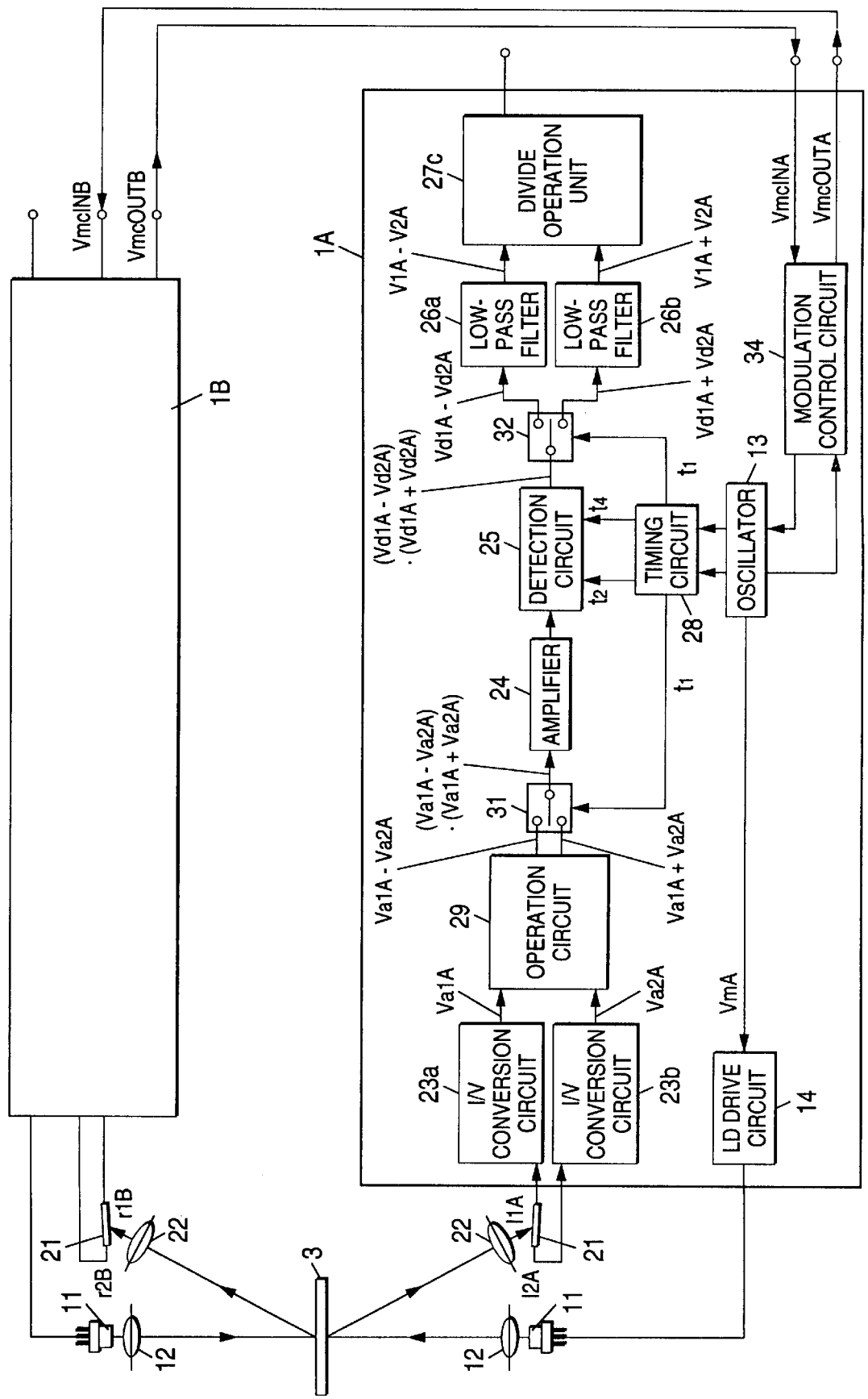
FIG. 8 is a block diagram to show a fifth embodiment of the invention.

FIG. 8 shows the configuration of a fifth embodiment of the invention. Displacement sensors 1A and 1B operate like those shown as FIG. 1 in Japanese Patent Application No. Hei 8-157680 previously made by the inventor. First, the operation of the displacement sensor 1A will be discussed. Position signals of electric signals output by a position detection element 21, 11A and 12A, are converted into electric signals Va1A and Va2A by I/V conversion circuits 23a and 23b and the electric signals Va1A and Va2A are input to an operation circuit 29, which then performs the operations of Va1A−Va2A and Va1A+Va2A and outputs the results to a switch circuit 31. Va1A−Va2A and Va1A+Va2A are input through the switch circuit 31 alternatively to an amplifier 24, which then amplifies the input at an appropriate amplification factor. Which of Va1A−Va2A and Va1A+Va2A is input to the amplifier 24 is determined under the control of a switch signal t1 output from a timing circuit 28. As seen from the comparison between FIG. 9 (*f*) and (*i*), the on duration of the switch signal t1 is set to twice that of a timing signal t2 described later.

The output signal of the amplifier 24 is synchronously detected by a detection circuit 25 and a signal component (Vd1A−Vd2A), (Vd1A+Vd2A) is extracted.

Figure 9:
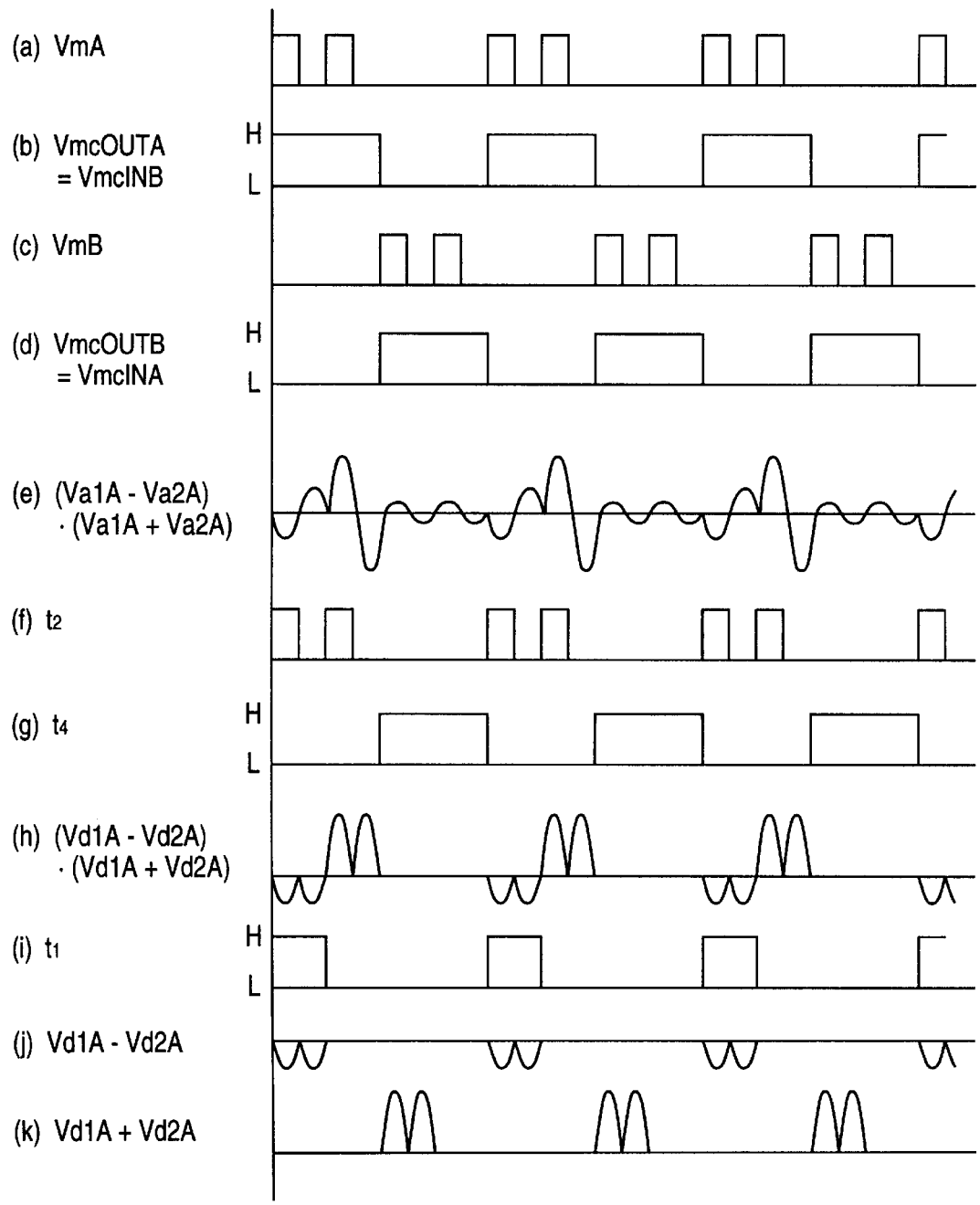
FIGS. 9 (a) to (k) are illustrations to explain the operation of the fifth embodiment of the invention.

The detection circuit 25 detects the input signal in synchronization with a timing signal t2 from the timing circuit 28 (see FIG. 9 (*f*)). When the timing signal t2 is high, the detection circuit 25 takes out the output signal of the amplifier 24 intact. When the timing signal t2 is low, the detection circuit 25 inverts the polarity of the output signal of the amplifier 24 and takes out the resultant signal. The signal component (Vd1A−Vd2A), (Vd1A+Vd2A) is separated into a pair of signal components Vd1A−Vd2A and Vd1A+Vd2A like pulsation waveforms corresponding to Va1A−Va2A and Va1A+Va2A by a switch circuit 32 controlled by the switch signal t1 so as to synchronize with the switch circuit 31.

The signal components Vd1A−Vd2A and Vd1A+Vd2A provided by the switch circuit 32 are input to low-pass filters 26a and 26b and DC components are taken out. Signals V1A−V2A and V1A+V2A are output through the low-pass filters 26a and 26b. The V1A−V2A is a signal equivalent to the difference between the signal values of the position signals 11A and 12A and the V1A+V2A is a signal equivalent to the sum of the signal values of the position signals 11A and 12A. The signals V1A−V2A and V1A+V2A output through the low-pass filters 26a and 26b are input to a division section 27c, which then performs the operation of (V1A−V2A)/(V1A+V2A) and outputs the result to an external system as a signal equivalent to the distance to an object 3.

The displacement sensor 1A performs subtraction of the electric signals Va1A and Va2A corresponding to the position signals 11A and 12A output from the position detection element 21 by the operation circuit 29 provided at the stage preceding the switch circuit 31. Thus, if the position signal 11A, 12A output from the position detection element 21 contains in-phase noise, the in-phase noise can be removed by the operation circuit 29; a distance measurement error can be lessened as compared with that in the conventional system and degradation of the resolution caused by the effect of the in-phase noise can be prevented.

By the way, also in the fifth embodiment, upon reception of modulation control input VmcINA (in the embodiment, when VmcINA is high), a modulation control circuit 34 stops the operation of an oscillator 13. If modulation control input VmcINA does not exist, the modulation control circuit 34 operates the oscillator 13 and outputs modulation control output VmcOUTA (in the embodiment, sets VmcOUTA high). If the operation of the oscillator 13 stops, the detection circuit 25 also stops the operation.

The description made so far applies to the displacement sensor 1A; the displacement sensor 1B also the same configuration and the modulation control circuits 34 of the displacement sensors 1A and 1B are connected to each other so that the modulation control output VmcOUT of one displacement sensor becomes the modulation control input VmcINB of the other displacement sensor. Therefore, while one displacement sensor 1A (1B) is operating, the other displacement sensor 1B (1A) neither generates nor detects beam light; both the displacement sensors 1A and 1B operate independently of each other in a time division manner. This means that the two displacement sensors 1A and 1B do not interfere with each other.

The operation timing of the configuration will be discussed with reference to FIG. 9. FIG. 9 (a) is output VmA of the oscillator 13 of the displacement sensor 1A; FIG. 9 (b) is modulation control output VmcOUTA of the displacement sensor 1A, namely, modulation control input VmcINB of the displacement sensor 1B; FIG. 9 (c) is output VmB of the oscillator 13 of the displacement sensor 1B; and FIG. 9 (d) is modulation control output VmcOUTB of the displacement sensor 1B, namely, modulation control input VmcINA of the displacement sensor 1A. As seen from the relationships, while the oscillator 13 of one displacement sensor 1A (1B) operates for causing the laser diode 11 to emit light, light emission is stopped in the other displacement sensor 1B (1A) (when the signals in FIG. 9 (b) and (d) are high, the operation is performed), preventing the laser diodes 11 of both the displacement sensors 1A and 1B from emitting light at the same time to suppress beam light interference.

The position detection element 21 receives light from both the displacement sensors 1A and 1B. Thus, in the displacement sensor 1A, the output signals (Va1A−Va2A) and (Va1A+Va2A) are provided from the switch circuit 31 as in FIG. 9 (e) even while the operation of the oscillator 13 stops. However, while the oscillator 13 of the displacement sensor 1A stops as in FIG. 9 (f) and (g), the operation of the detection circuit 25 is also stopped (when the signal in FIG. 9 (g) is high, the operation is stopped), thereby preventing the distance from being found by light of the other displacement sensor 1A (1B). That is, the output of the detection circuit 25 of the displacement sensor 1A becomes as shown in FIG. 9 (h) and becomes 0 V during the operation of the displacement sensor 1B, so that the effect of the operation of the other displacement sensor 1B can be removed. FIG. 9 (i) shows the timing signal t1 for switching the switch circuit 32. The signal components Vd1A−Vd2A and Vd1A+Vd2A are separated as in FIG. 9 (j) and (k) by the switch circuit 32.

As we have discussed, the two displacement sensors 1A and 1B operate alternately, whereby they can measure the distance without interfering with each other. In the embodiment, the displacement sensors 1A and 1B for executing distance measurement are switched every two light emission cycles of the laser diode 11, but the cycles are not limited.

In the conventional configuration, the two I/V conversion circuits 23a and 23b, the two amplifiers 24a and 24b, and the two detection circuits 25a and 25b are provided for the position signals 11A and 12A output from the position detection element 21; in the embodiment, the amplifier 24 and the detection circuit 25 are provided only as one channel and the signals are switched by the switch circuits 31 and 32. The displacement sensors 1A and 1B are configured as in the embodiment, whereby the position signals 11A and 12A are also processed with the same characteristic in the transient period in which output of the oscillator 13 of each displacement sensor 1A, 1B is stopped or started, so that an error is not produced in distance measurement. In the state of the art, it is difficult to complete the circuits for processing both the position signals 11A and 12A in responsivity in the conventional configuration. Even if perfect adjustments and corrections are made, the circuits will differ in responsivity due to temperature change or change with time. If the conventional configuration is adopted, a measurement error is not avoided. In contrast, if the configuration of the embodiment is adopted, this kind of measurement error does not occur in principle, so that measurement accuracy is enhanced.

Sixth Embodiment

Figure 10:
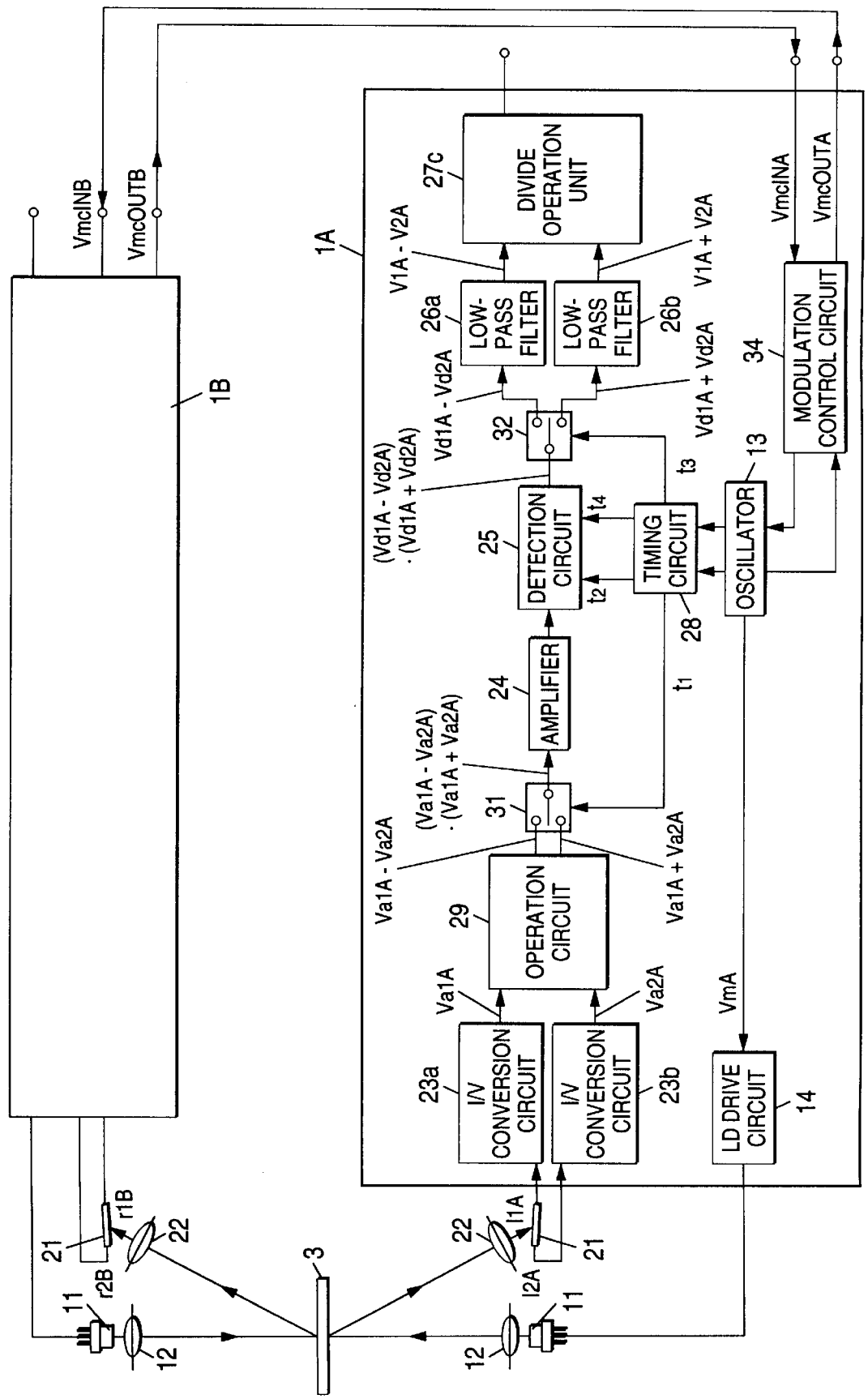
FIG. 10 is a block diagram to show a sixth embodiment of the invention.

In a sixth embodiment of the invention, switch circuits 31 and 32 are controlled by using different switch timing signals t1 and t5, as shown in FIG. 10. As seen from the comparison between FIGS. 9 and 11, timing signals t2 and t4 given to a detection circuit 25 are also made different from those in the fifth embodiment.

That is, in the configuration of the fifth embodiment like the first embodiment, measurement is started just after the operation of the displacement sensor 1A, 1B is switched by the modulation control circuit 34. Thus, signal processing may be delayed and waveform distortion may occur depending on the responsivity of the displacement sensor 1A, 1B. Resultantly, an error may occur in the distance measurement accuracy. Then, in the sixth embodiment, distance measurement is not executed until beam light and the processing circuitry operation become stable after displacement sensor 1A, 1B is switched, as in the fifth embodiment.

Figure 11:
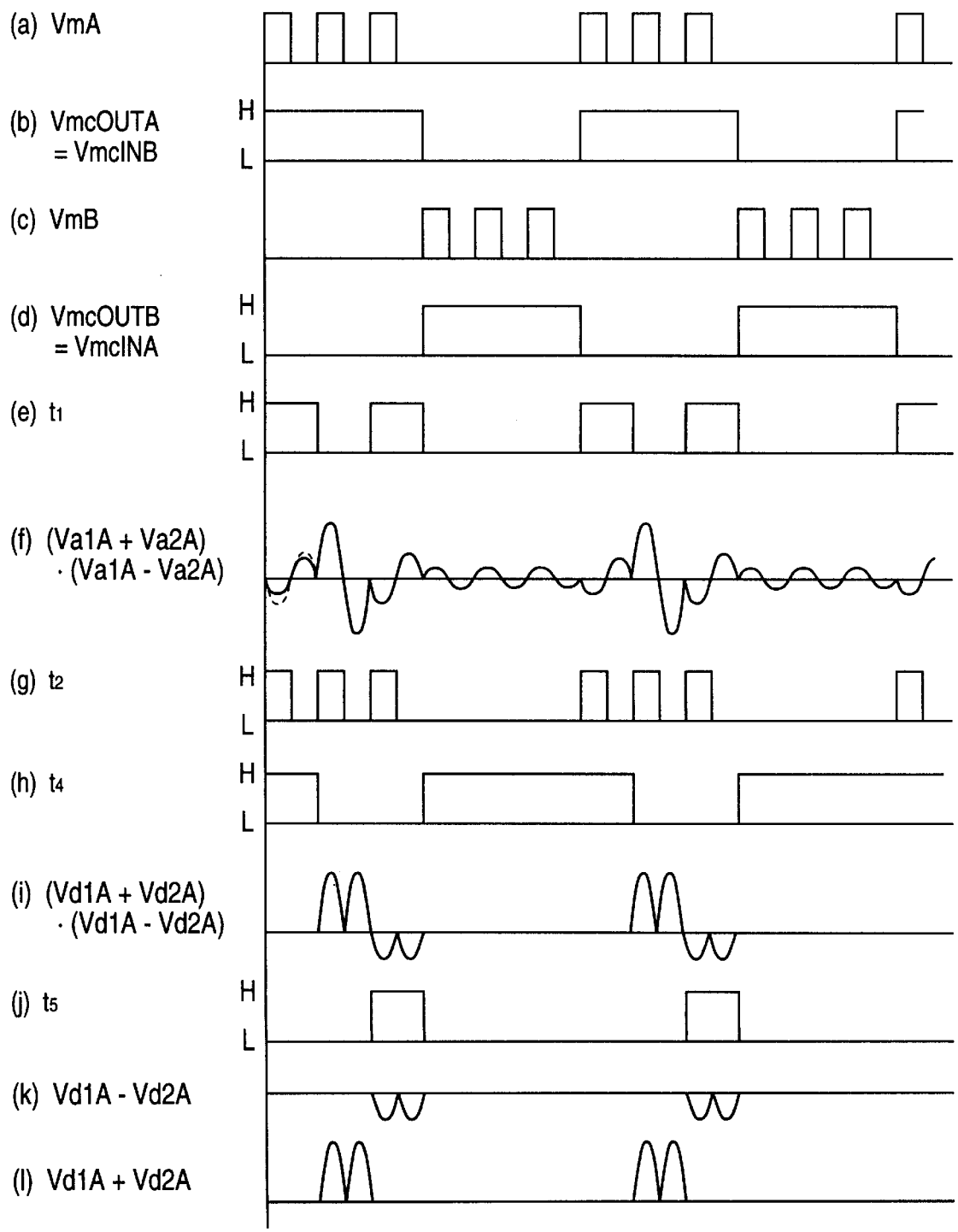
FIGS. 11 (a) to (l) are illustrations to explain the operation of the sixth embodiment of the invention.

FIG. 11 shows an example wherein the operation of the displacement sensor 1A, 1B becomes stable in one cycle of output VmA, VmB of an oscillator 13. That is, just after the displacement sensor 1A, 1B is switched, the waveform should become a waveform as indicated by the phantom line, but becomes a waveform as indicated by the solid line, as shown in FIG. 11 (f). Then, beam light emission is started just after the switching as in FIG. 11 (a) and the timing signal t2 is given to the detection circuit 25 as in FIG. 11 (h), but output of the detection circuit 25 is inhibited as in FIG. 11 (h). In association with the operation, the switch signals t1 and t5 used for switching of switch circuits 31 and 32 become as shown in FIG. 11 (e) and (j) respectively, output of the detection circuit 25 becomes as shown in FIG. 11 (i), and output of the switch circuit 32 becomes as shown in FIG. 11 (k) and (l). In short, the sixth embodiment differs from the fifth embodiment only in that output of the detection circuit 25 is not taken out until the operation becomes stable after the displacement sensor 1A, 1B is switched and that the switch timings of the switch circuits 31 and 32 are also changed accordingly.

The configuration enables distance measurement after the operation becomes stable; the measurement accuracy is furthermore enhanced.

Seventh Embodiment

Figure 12:
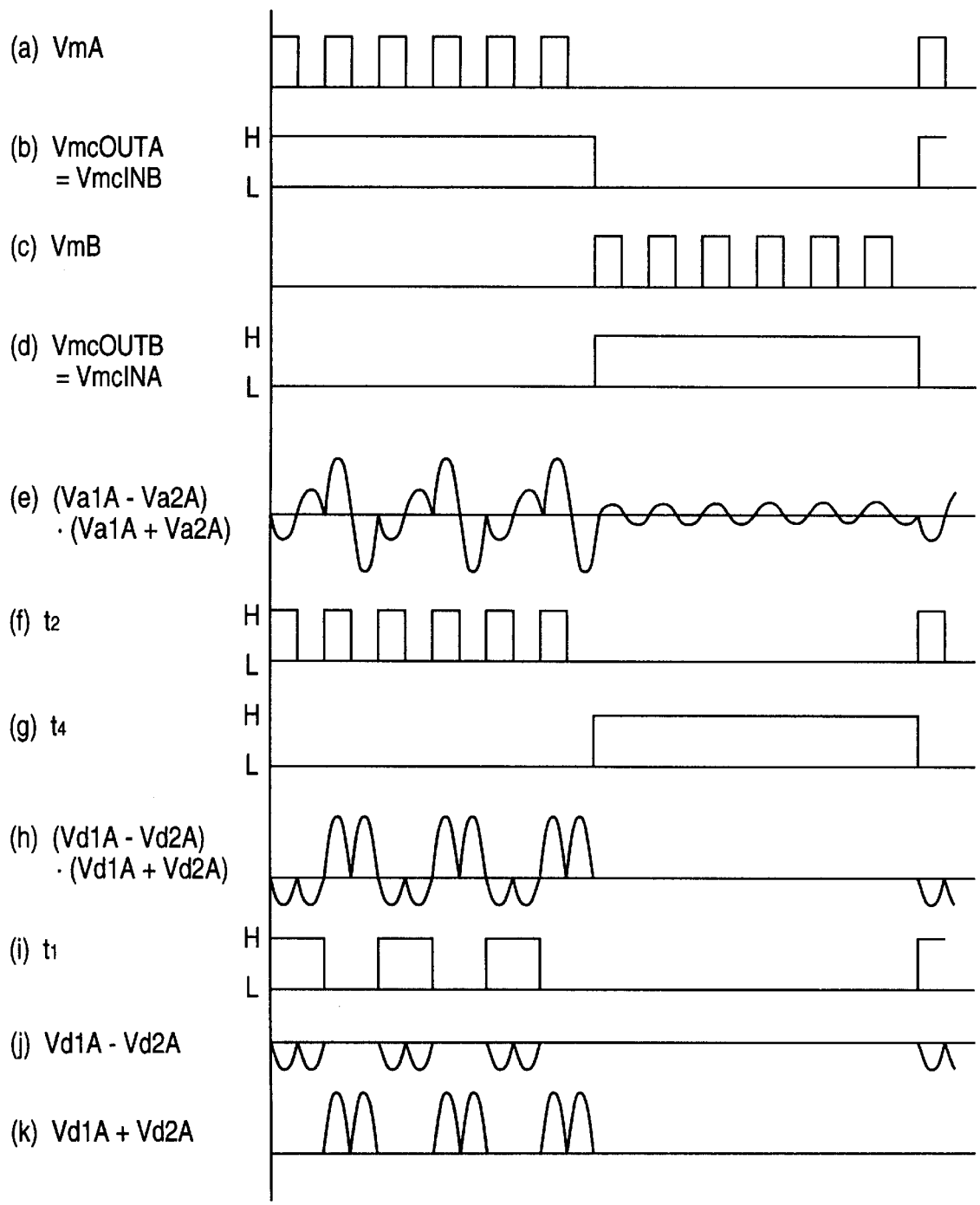
FIGS. 12 (a) to (k) are illustration to explain the operation of a seventh embodiment of the invention.

In a seventh embodiment of the invention, timing signals t2 and t4 in the circuit configuration of the fifth embodiment are changed, as shown in FIG. 12. That is, in the fifth embodiment, the laser diode 11 is made to emit light twice each time the operation of the displacement sensor 1A, 1B is changed; in the seventh embodiment, a laser diode 11 is made to emit light six times each time the operation of displacement sensor 1A, 1B is changed. The number of light emission times is not limited to six. The number of times is selected to the degree to which a measurement value error just after the operation of the displacement sensor 1A, 1B is changed can be ignored for an average value of measurement values found by emitting light more than once. If the distances found by emitting light more than once are integrated, etc., for finding a value equivalent to the average value, error percentage can be decreased.

Like the sixth embodiment, the seventh embodiment provides countermeasures against occurrence of an error in the measurement value just after the operation of the displacement sensor 1A, 1B is changed. However, the need for discarding the measurement values found while the operation is unstable as in the sixth embodiment is eliminated in the seventh embodiment, so that the timings in the seventh embodiment are simpler than those in the sixth embodiment. In the fifth embodiment, light is emitted twice each time the operation of the displacement sensor 1A, 1B is changed; in the seventh embodiment, light is emitted 2 N times (where N is 2 or more) each time the operation of displacement sensor 1A, 1B is changed. Other components and operation of the seventh are similar to those of the fifth embodiment.

Eighth Embodiment

Figure 13:
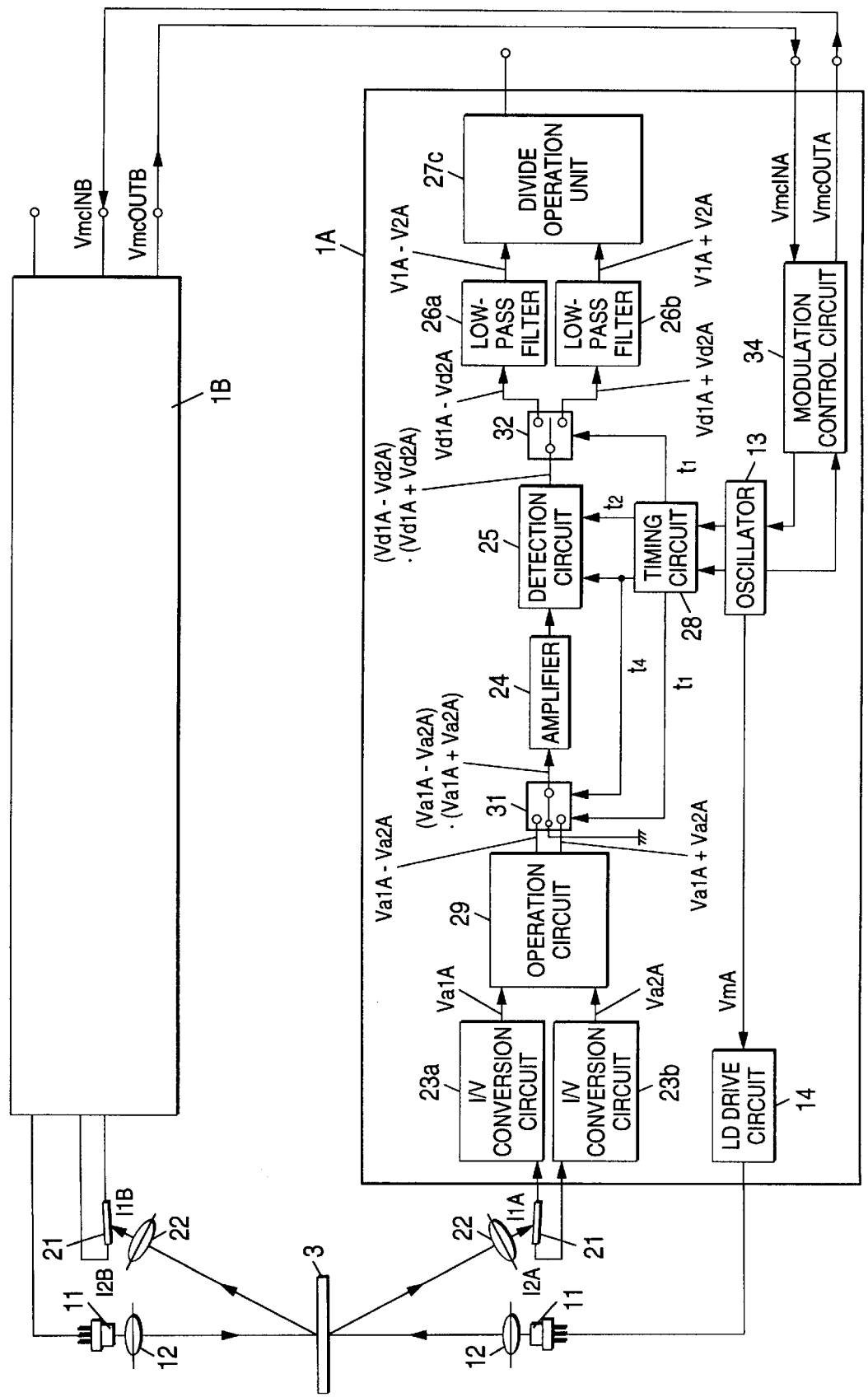
FIG. 13 is a block diagram to show an eighth embodiment of the invention.
Figure 14:
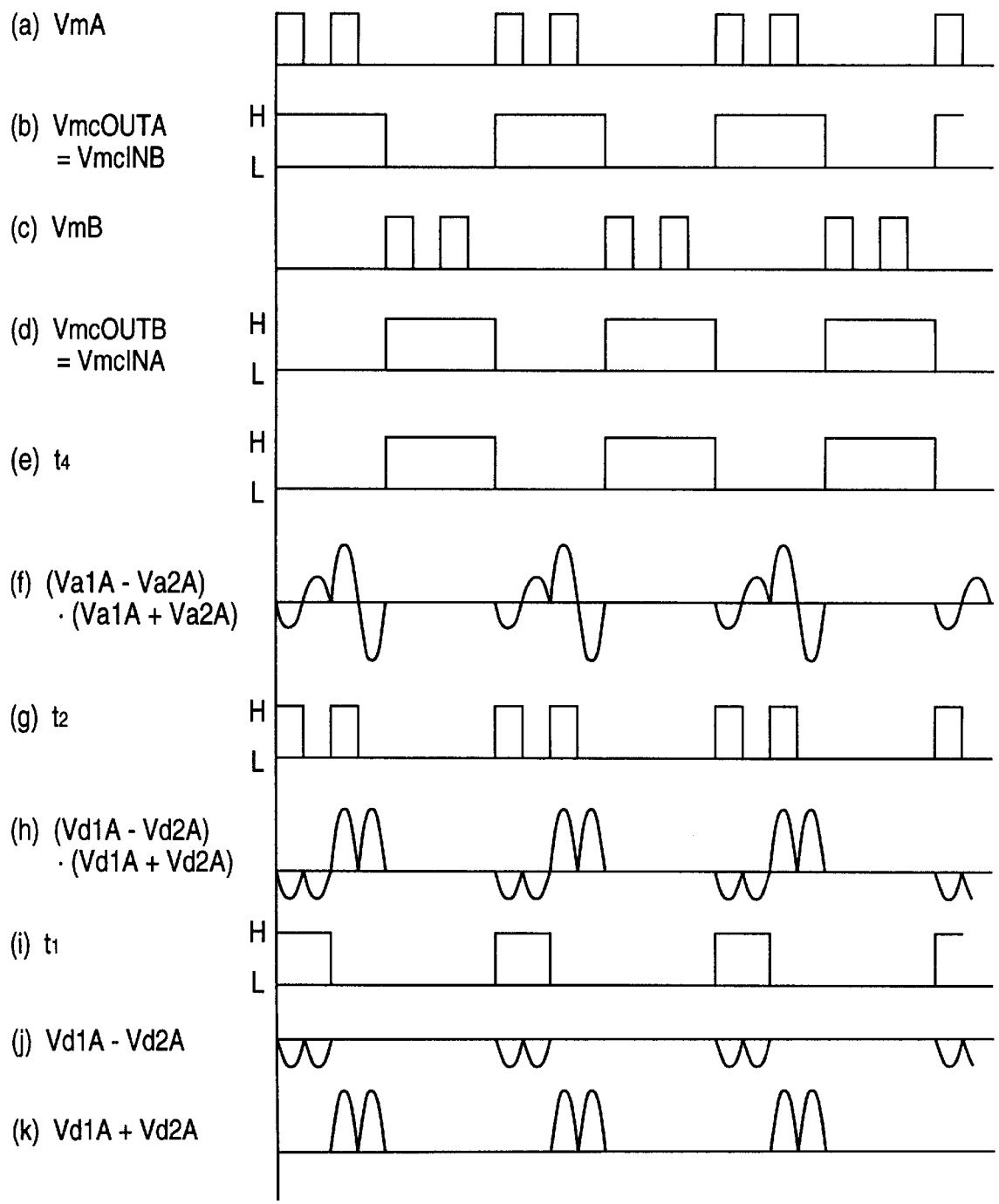
FIGS. 14 (a) to (k) are illustrations to explain the operation of the eighth embodiment of the invention.

An eighth embodiment of the invention differs from the fifth embodiment in that the switch circuit 31 in the fifth embodiment always inputs either of the signals Va1A–Va2A and Va1A+Va2A output from the operation circuit 29 to the amplifier 24; whereas the eighth embodiment uses a switch circuit 31' having a mode of inputting neither of the signals Va1A–Va2A and Va1A+Va2A to an amplifier 24, as shown in FIG. 13. In short, in the fifth embodiment, output of the detection circuit 25 is stopped during the operation of the associated displacement sensor 1A, 1B; in the eighth embodiment, input from an operation circuit 29 to the amplifier 24 is inhibited during the operation of the associated displacement sensor 1A, 1B. This means that the switch circuit 31' taking three positions is controlled by using a timing signal t4 as well as a switch signal t1, as shown in FIG. 14.

According to the configuration of the eighth embodiment, even if a position detection element 21 receives disturbance light having a drastically larger light amount than the normally received light amount, output of the position detection element can be prevented from being input to the amplifier 24. If output of the position detection element 21 is abnormally large, the amplifier 24 is saturated or cannot be used in a linear region. Resultantly, waveform distortion occurs in output of a detection circuit 25. In the eighth embodiment, however, output of the operation circuit 29 based on position signals 11A and 11B generated based on disturbance light are not input to the amplifier 24 during the operation of the other displacement sensor 1A, 1B, thus the possibility that the situation as described above can be avoided is raised. Resultantly, the reliability of the measurement result is enhanced. The configuration of the eighth embodiment is effective particularly when light output of the other displacement sensor 1A, 1B is large. Other components and operation of the eighth embodiment are similar to those of the fifth embodiment.

Ninth Embodiment

The displacement sensors 1A and 1B described above are adapted to prevent interference with each other when a plurality of the sensors are used; they are not considered for single use and can be used only if another displacement sensor 1A, 1B is connected to one displacement sensor 1A, 1B. Therefore, they must be manufactured aside from singly used displacement sensors. If the singly used displacement sensors and the displacement sensors 1A, 1B adapted to prevent interference with each other are manufactured, the manufacturing line becomes complicated and inventory management becomes burdensome. It may become necessary to change the operation mode for using one displacement sensor 1A, 1B singly or to prevent mutual interference in response to the purpose of the sensor. To change the operation mode, a manual switch can also be used; however, miniaturization and cost reduction are hard to accomplish and it is troublesome to handle the switch manually. In addition, it is substantially impossible to use the operation mode of the displacement sensor 1A, 1B in a time management manner.

Figure 15:
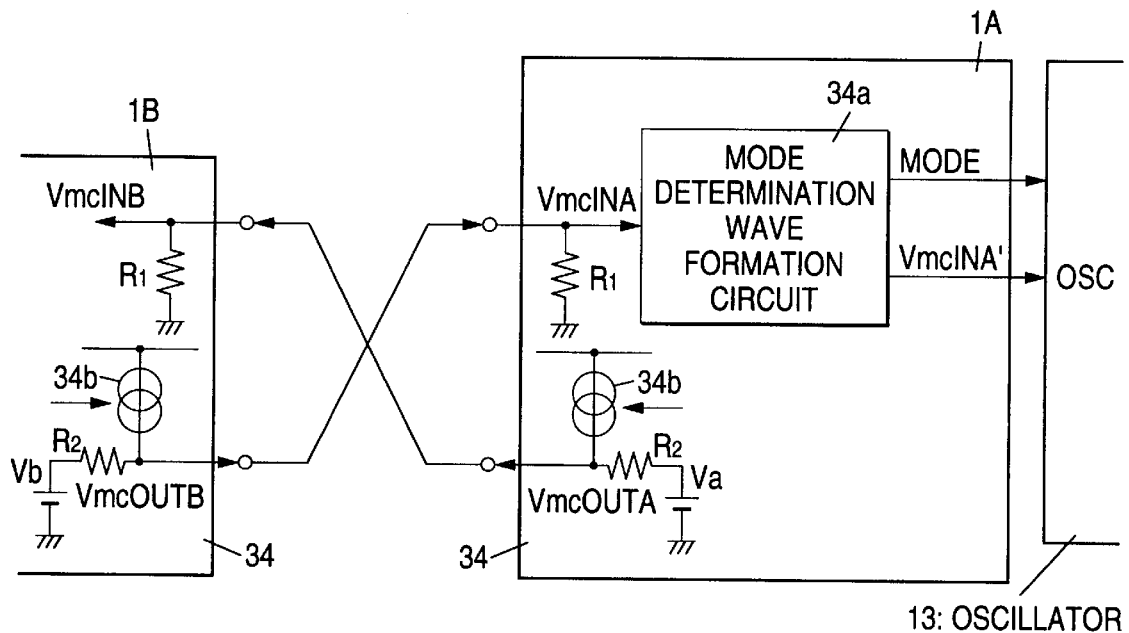
FIG. 15 (a) is a main part circuit diagram to show a ninth embodiment of the invention.
Figure 15:
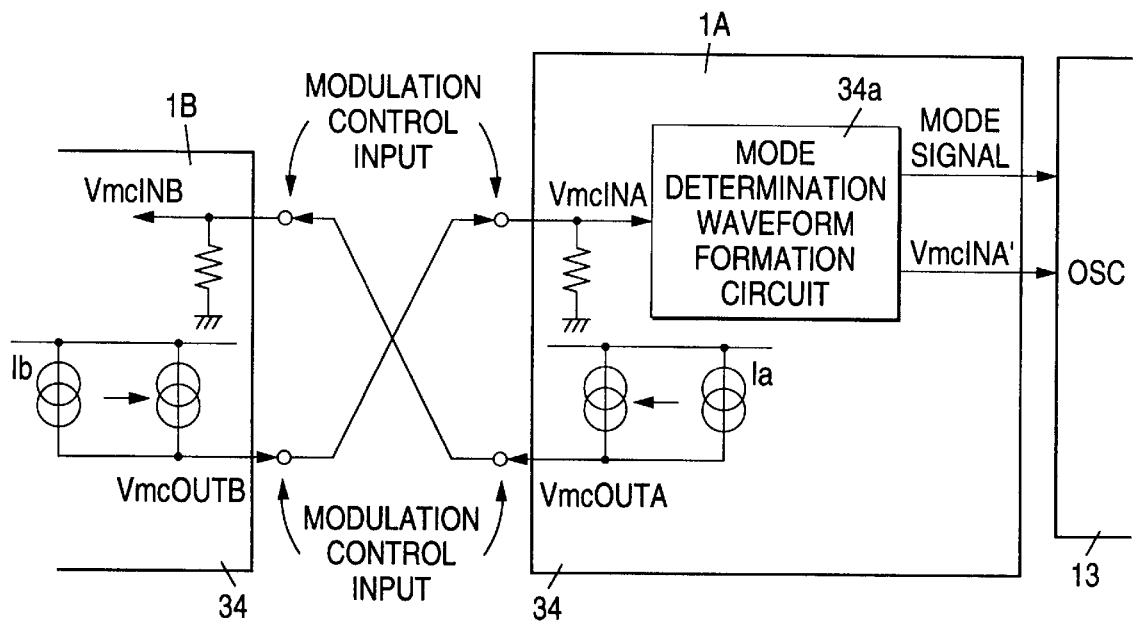
Figure 15:
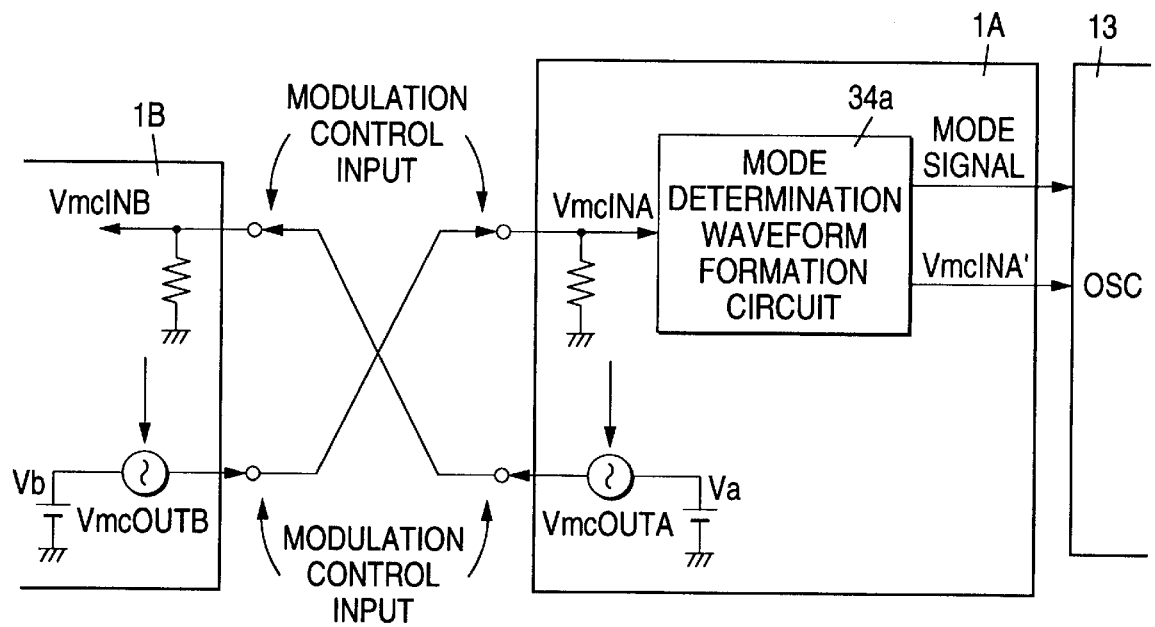
Figure 15:
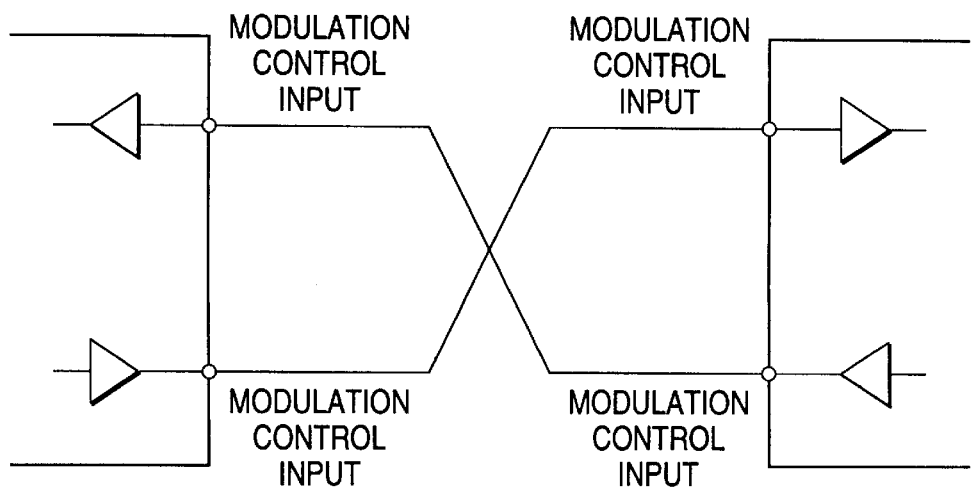

Then, a ninth embodiment of the invention provides displacement sensors 1A, 1B that can not only prevent mutual interference, but also be used singly without use of a manual switch to change the operation mode. That is, a mode determination waveform formation circuit 34a is added to a modulation control circuit 34 for determining the operation mode, as shown in FIG. 15. Hereinafter, the operation mode for preventing mutual interference will be referred to as "interference prevention mode" and the operation mode for single use will be referred to as "single mode."

Figure 16:
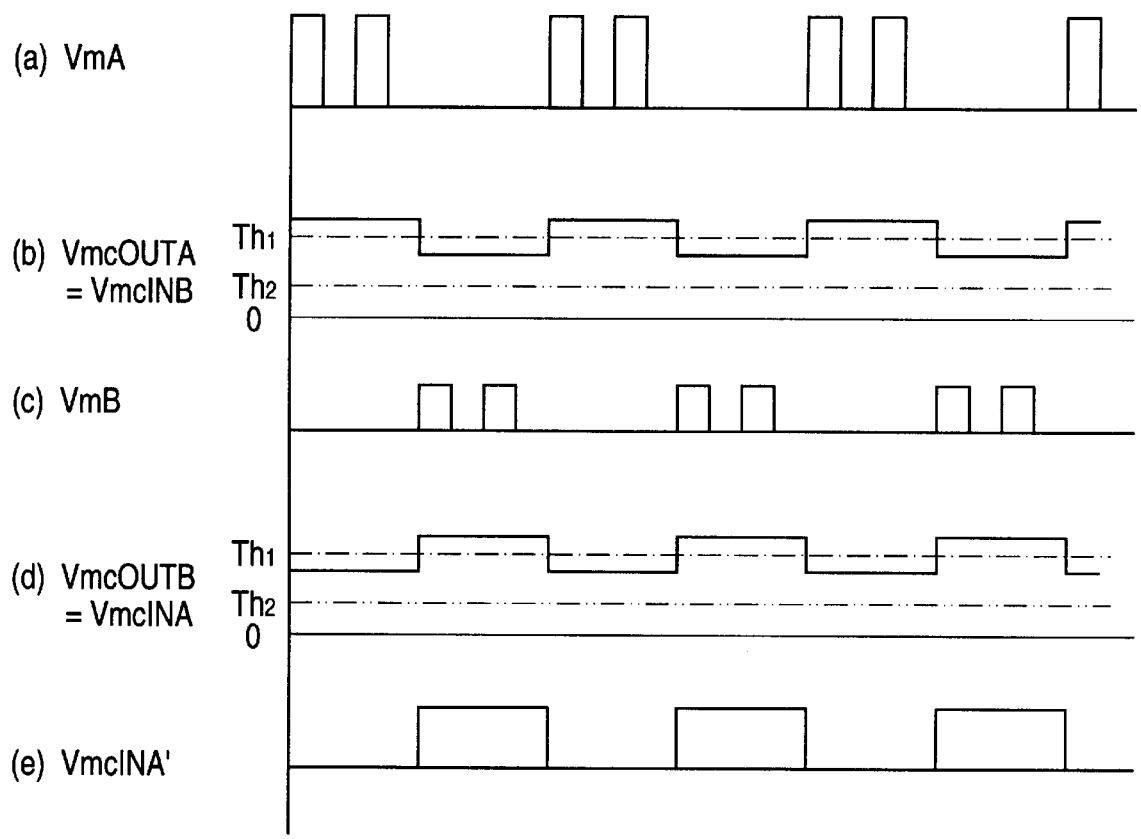
FIGS. 16 (a) to (e) are illustrations to explain the operation of the ninth embodiment of the invention.

As shown in FIG. 16, the mode determination waveform formation circuit 34a has two threshold values Th1 and Th2 and makes comparison between modulation control input VmcINA, VmcINB and the threshold value Th1, Th2 with respect to greater-than, equal-to, or less-than relation. The threshold value Th2 is used to change the operation mode. When the modulation control input VmcINA, VmcINB is greater than the threshold value Th2, the interference prevention mode is selected; when the modulation control input VmcINA, VmcINB is less than the threshold value Th2, the single mode is selected. This means that the mode determination waveform formation circuit 34a gives a mode signal Mode to an oscillator 13, thereby changing the operation when another displacement sensor 1A, 1B exists and that when another displacement sensor 1A, 1B does not exist. The threshold value Th1 is used to determine whether or not another displacement sensor 1A, 1B is operating in the interference prevention mode.

To make such change, each displacement sensor 1A, 1B is provided with a constant current source 34b, a constant voltage source Va, Vb, and resistors R1 and R2. Since input to the mode determination waveform formation circuit 34a is pulled down by the resistor R1, if the modulation control input VmcINA, VmcINB does not exist, namely, another displacement sensor 1A, 1B is not connected, the input to the mode determination waveform formation circuit 34a is 0 V, thus is lower than the threshold value Th2 and the single mode is selected.

On the other hand, modulation control output VmcOUTA, VmcOUTB of the displacement sensor 1A, 1B is connected via the resistor R2 to the constant voltage source Va, Vb having a voltage higher than the threshold value Th2. Thus, when another displacement sensor 1A, 1B is connected, the mode determination waveform formation circuit 34a sets the mode signal Mode to the interference prevention mode. The constant current source 34b is used to stop the operation of the displacement sensor 1A, 1B during the operation of another displacement sensor 1A, 1B. The displacement sensor 1A, 1B which is operating causes a current to flow into the resistor R2 from the constant current source 34b for raising the modulation control output VmcOUTA, VmcOUTB to a voltage value higher than the threshold value Th1. The arrow shown near the constant current source 34b in FIG. 15 denotes that a signal is given for controlling the constant current source 34b on/off. One displacement sensor 1A, 1B stops the operation while the other is operating, as shown in FIG. 16 (a)–(d). In the interference prevention mode, whether or not the displacement sensor 1A, 1B operates is determined by combination of the threshold values Th1 and Th2. Thus, the mode determination waveform formation circuit 34a generates a signal VmcINA', VmcINB' equivalent to the modulation control input in the first and fifth embodiments as shown in FIG. 16 (e) according to the combination and controls the oscillator 13 by the signal VmcINA, VmcINB.

In the ninth embodiment, the threshold value Th2 to change the operation mode is set lower than the threshold value Th1 used to determine whether or not another displacement sensor 1A, 1B is operating. However, the greater-than or less-than relation between the threshold values Th1 and Th2 can also be set to the opposite relation. In this case, it is necessary to pull up the modulation control input VmcINA, VmcINB and change the relationships among the constant current source 34b, the constant voltage source Va, Vb, the resistor R2, etc.

Of course, to change the operation mode is not limited by the embodiment described above. For example, as shown in FIG. 15 (b) to (d), to change the operation mode is achieved by a structure including a constant current source generating a clock pulse and two constant current sources for a mode determination, a structure including a constant power source generating a clock pulse and two constant power sources for a mode determination, and a clock pulse formation and a mode determination by a software. The first and second structures employ the same waveforms as shown in FIG. 16 such a that the DC components are interposed. In the third method, the mode determination is enjoyed by the software so that waveform corresponds a logical waveform such that Gnd corresponds to "Low" and Vcc corresponds to "High".

As shown in FIG. 15 (b), the constant current source is used for a mode determination. Two constant current sources are connected in parallel in such a manner that one constant current source employs a direct current source and the other constant current source employs an alternative current source for a clock generation.

As shown in FIG. 15 (c), the constant power source is used for a clock waveform generation. Two constant power sources are connected in serious in such a manner that one constant power source employs a direct current source and the other constant power source employs an alternative current source for a clock generation.

As shown in FIG. 15 (c), the software processing is performed by a microprocessor or the like. The output terminal outputs a normal clock waveform and the input terminal employs an interrupt function in software so that the mode determination is performed whether or not a signal exists.

Tenth Embodiment

Figure 17:
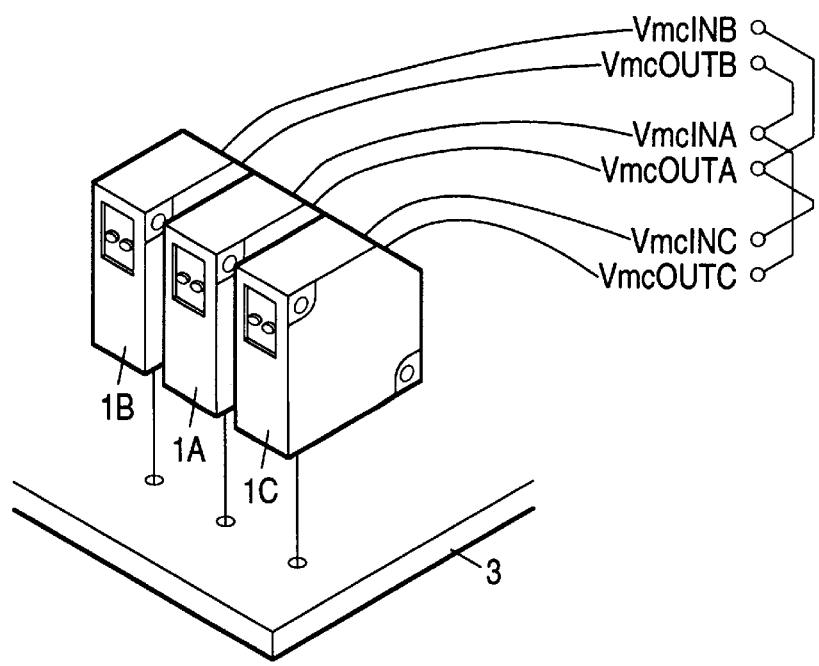
FIG. 17 is an illustration to show a placement example of a tenth embodiment of the invention.

A tenth embodiment of the invention uses three displacement sensors 1A, 1B, and 1C, as shown in FIG. 17. In the embodiment, an example wherein the displacement sensors 1A, 1B, and 1C are placed side by side is shown as a placement example in which they can interfere with each other. In the placement example, it is assumed that there is a possibility that the side displacement sensor 1B, 1C may interfere with the center displacement sensor 1A, but that the side displacement sensors 1B and 1C do not interfere with each other.

Figure 18:
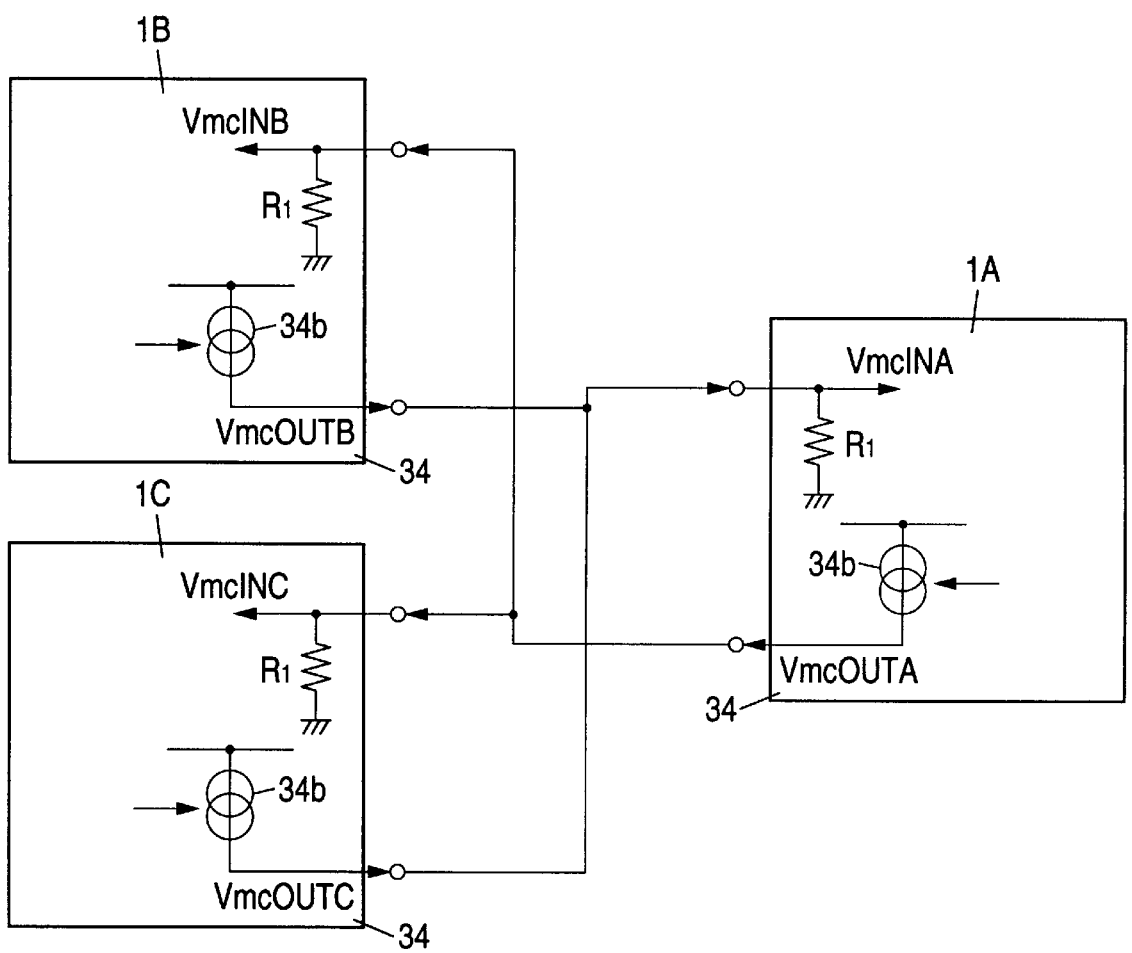
FIG. 18 is a main part circuit diagram to show the tenth embodiment of the invention.

Therefore, it is not necessary to operate the displacement sensors 1B and 1C alternatively, but necessary to operate the displacement sensor 1B, 1C and the displacement sensor 1A alternatively. Then, as shown in FIG. 18, both modulation control inputs VmcINB and VmcINC of the displacement sensors 1B and 1C are modulation control output VmcOUTA of the displacement sensor 1A. Likewise, the logical sum of modulation control outputs VmcOUTB and VmcOUTC of the displacement sensors 1B and 1C is modulation control input VmcINA of the displacement sensor 1A. Here, three displacement sensors 1A, 1B, and 1C are shown, but the same also applies to installation of a larger number of displacement sensors; modulation control input and modulation control output may be made common among the displacement sensors not interfering with each other and the displacement sensors interfering with each other may give modulation control input and modulation control output to each other.

By the way, in the embodiment, output of a modulation control circuit 34 of each displacement sensor 1A, 1B, 1C (modulation control output VmcOUTA, VmcOUTB, VmcOUTC) is current output and input of the modulation control circuit 34 (modulation control input VmcINA, VmcINB, VmcINC) is provided with a pull-down resistor R1.

Figure 19:
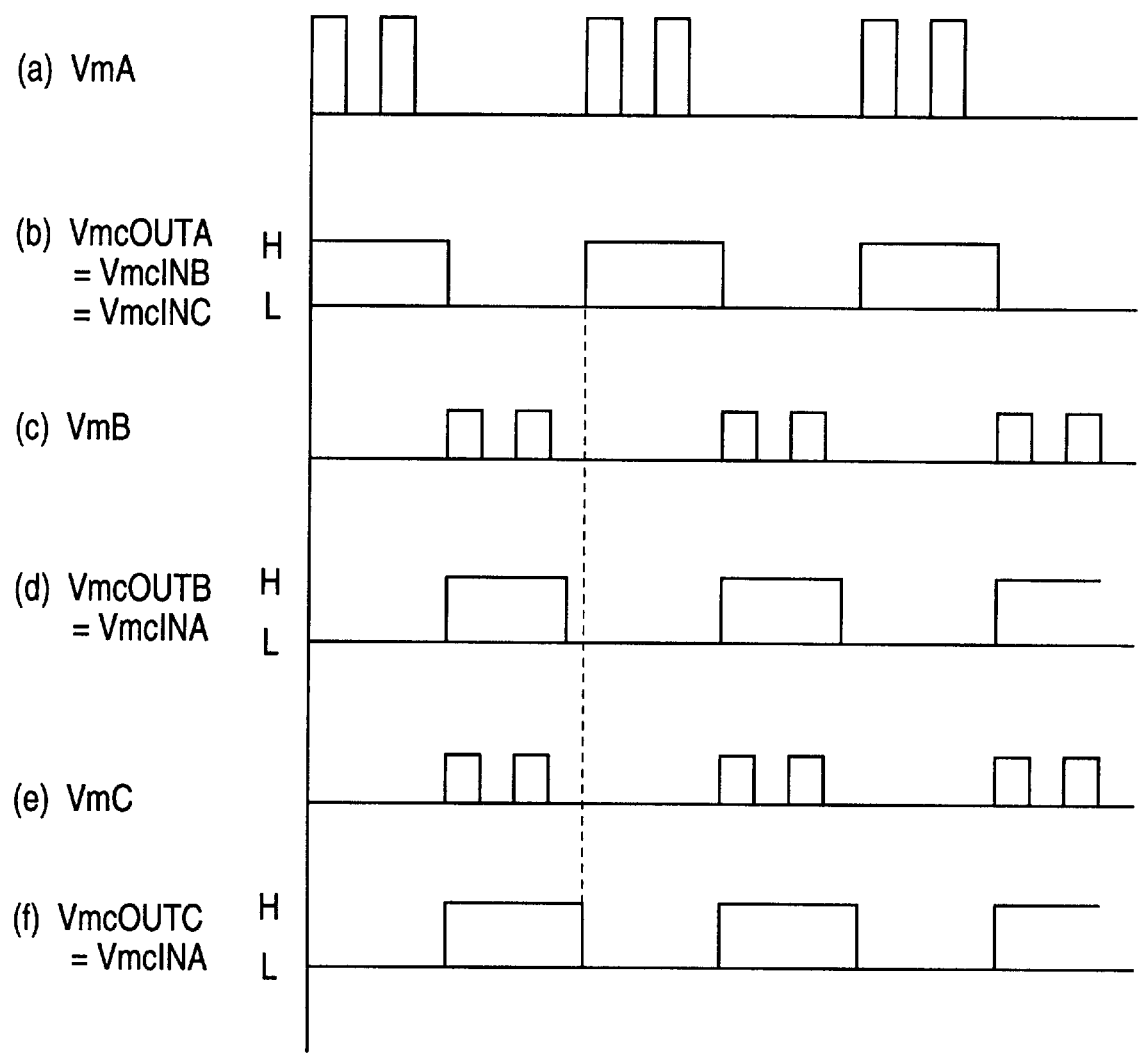
FIGS. 19 (a) to (f) are illustrations to explain the operation of the tenth embodiment of the invention.

Therefore, as shown in FIG. 19, while the displacement sensor 1A is operating, the distance measurement operation of the displacement sensor 1B, 1C stops; while the displacement sensor 1B, 1C is operating, the distance measurement operation of the displacement sensor 1A stops. The displacement sensors 1B and 1C seem to operate synchronously in the figure, but the timing is not taken therebetween. The displacement sensors 1B and 1C do not necessarily stop the distance measurement operation at the same time. However, since the distance measurement of the displacement sensor 1A is started after the termination of the distance measurement operation of the displacement sensor 1B or 1C, whichever is the later, mutual interference between the displacement sensors 1A and 1B, 1C does not occur.

The embodiment provides the configuration wherein a plurality of displacement sensors are classified into two groups and are connected so that they do not interfere with each other. In the embodiment, three displacement sensors are shown, but the number of displacement sensors is not limited except for the current capacity of each displacement sensor, etc. Other components and operation of the tenth embodiment are similar to those of the first and fifth embodiments.

Eleventh Embodiment

Figure 20:
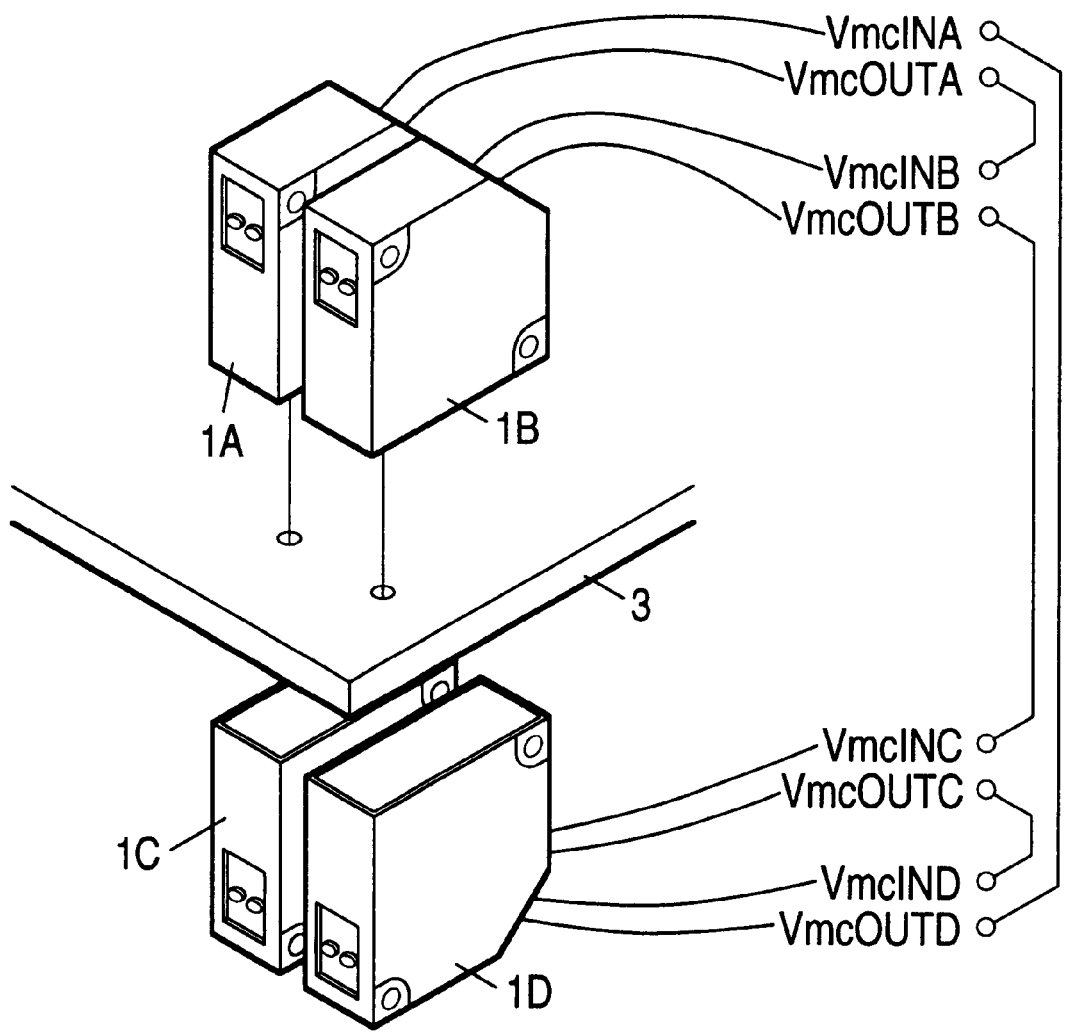
FIG. 20 is an illustration to show a placement example of an eleventh embodiment of the invention.

In an eleventh embodiment of the invention, four displacement sensors 1A, 1B, 1C, and 1D are placed with two side by side and two side by side and the two groups opposed to each other as shown in FIG. 20. In such a placement example, there is a possibility that the four displacement sensors 1A, 1B, 1C, and 1D may interfere with each other. To prevent a number of displacement sensors 1A, 1B, 1C, and 1D from interfering with each other, in the embodiment, each displacement sensor 1A, 1B, 1C, 1D starts the distance measurement operation on the rising edge of an input signal to modulation control input VmcINA, VmcINB, VmcINC, VmcIND and as shown in FIG. 20, modulation control outputs VmcOUTA, VmcOUTB, VmcOUTC, and VmcOUTD of displacement sensors 1A, 1B, 1C, and 1D are connected to modulation control inputs VmcINA, VmcINB, VmcINC, and VmcIND of different displacement sensors 1A, 1B, 1C, and 1D in sequence. More specifically, the modulation control output VmcOUTA of the displacement sensor 1A is connected to the modulation control input VmcINB of the displacement sensor 1B, VmcOUTB to VmcINC, VmcOUTC to VmcIND, and VmcOUTD to VmcINA, whereby the displacement sensors 1A, 1B, 1C, and 1D are connected in series or like a ring.

Figure 21:
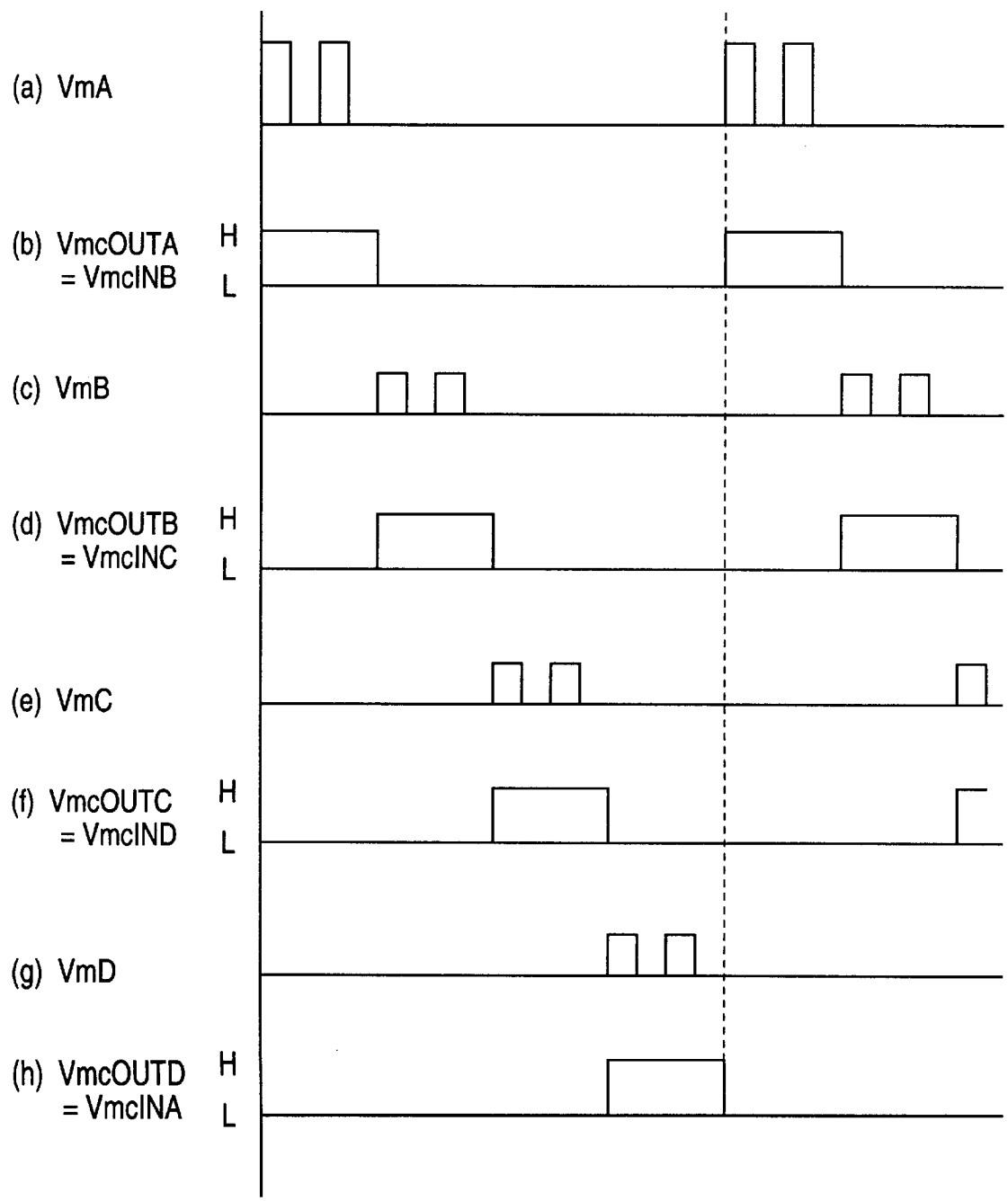
FIGS. 21 (a) to (h) are illustrations to explain the operation of the eleventh embodiment of the invention.

In the configuration, after stopping the distance measurement operation, one displacement sensor 1A, 1B, 1C, 1D stops the distance measurement operation until the modulation control input VmcINA, VmcINB, VmcINC, VmcIND given from another displacement sensor 1A, 1B, 1C, 1D rises. Therefore, in the stationary operation, as shown in FIG. 21, while the displacement sensor 1A is executing distance measurement, the operation of the displacement sensor 1B is stopped, and other displacement sensors 1C and 1D stop the distance measurement operation until the modulation control inputs VmcINC and VmcIND rise respectively. Upon completion of the distance measurement operation of the displacement sensor 1A, the modulation control input VmcINB to the displacement sensor 1B rises, thus the displacement sensor 1B starts the operation. Then, the displacement sensors 1C and 1D start the operation alternatively in sequence and upon completion of the operation of the displacement sensor 1D, the modulation control input VmcINA to the displacement sensor 1A rises and the displacement sensor 1A again starts the operation.

As we have discussed, the displacement sensors 1A, 1B, 1C, and 1D perform the distance measurement operation in sequence, so that as many displacement sensors as required can be connected in series. Moreover, two sets are connected at a time between the displacement sensors and the connection is easy.

The configurations of the tenth and eleventh embodiments can be made common; prevention of interference between the displacement sensors classified into two groups or prevention of interference of the displacement sensors with each other can be easily set only by changing the connection manner of the displacement sensors.

Twelfth Embodiment

Figure 22:
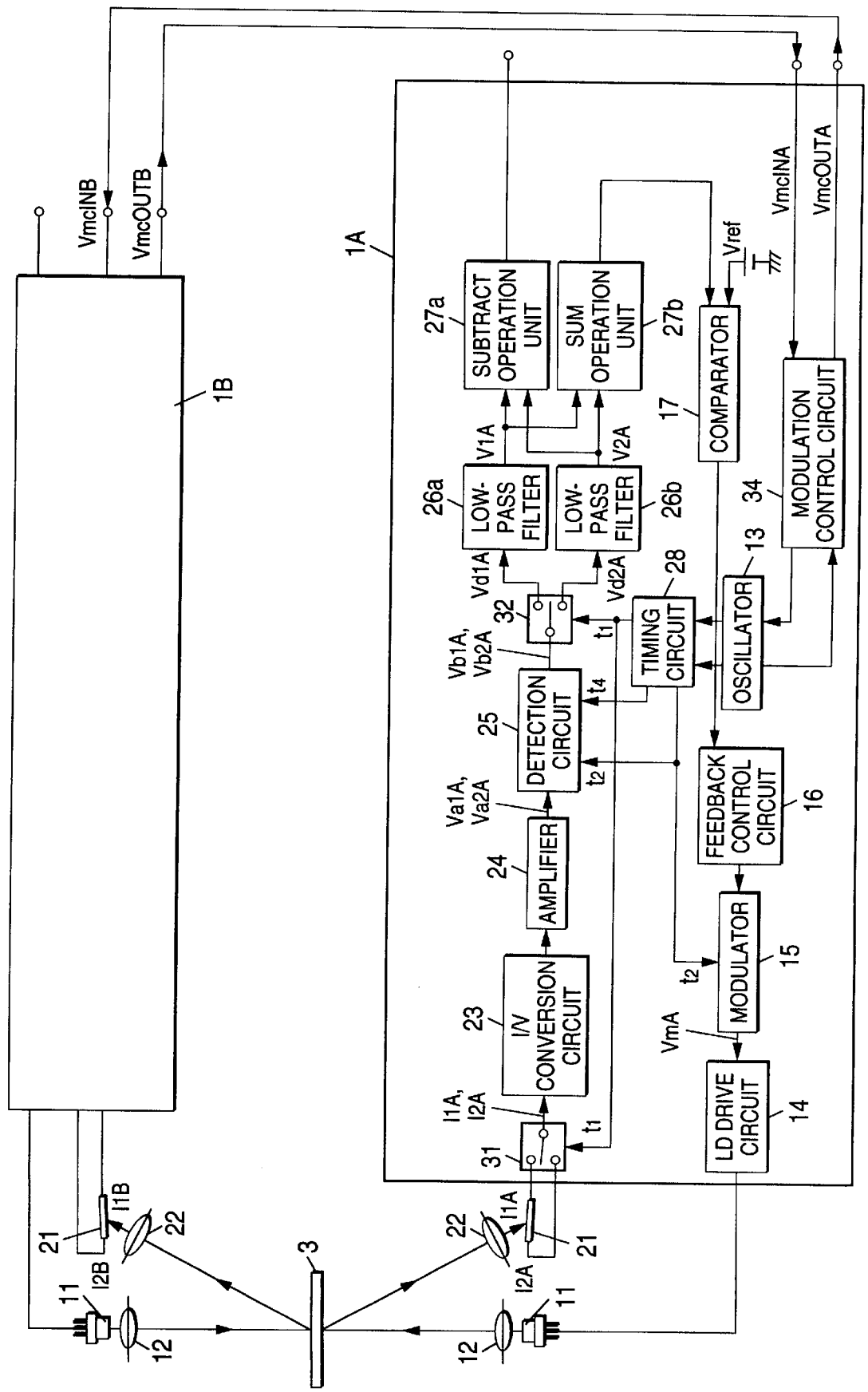
FIG. 22 is a block diagram to show a twelfth embodiment of the invention.

Displacement sensors 1A and 1B of a twelfth embodiment of the invention find a distance with no division section 27c, as shown in FIG. 22. An output voltage of a sum calculation section 27b is assumed to be equivalent to all light amount incident on a position detection element 21 and a comparison circuit 17 compares the output voltage with reference voltage Vref and outputs a signal equivalent to the difference between the output voltage of the sum calculation section 27b and the reference voltage Vref to a feedback control circuit 16. The feedback control circuit 16 executes amplitude modulation with a timing signal t2 from a timing circuit 28 as a carrier through a modulator 15 and drives a laser diode 11 through an LD drive circuit 14. In short, light output of the laser diode 11 undergoes feedback control in response to the received light amount at the position detection element 11.

If the configuration is adopted, the output of the sum calculation section 27b is held at the reference voltage Vref as a constant value and the denominator when a distance finding operation is performed becomes a constant value, thus output of a difference calculation section 27c becomes equivalent to the distance to an object 3. This eliminates the need for division section 27c. Moreover, the light output of the laser diode 11 can be adjusted in response to the received light amount at the position detection element 21, so that the light amount can be adjusted in response to the reflection factor or distance of the object 3 and the distance can be measured accurately in the dynamic range of the processing circuit. Other components and operation of the twelfth embodiment are similar to those of the first embodiment.

Thirteenth Embodiment

Figure 23:
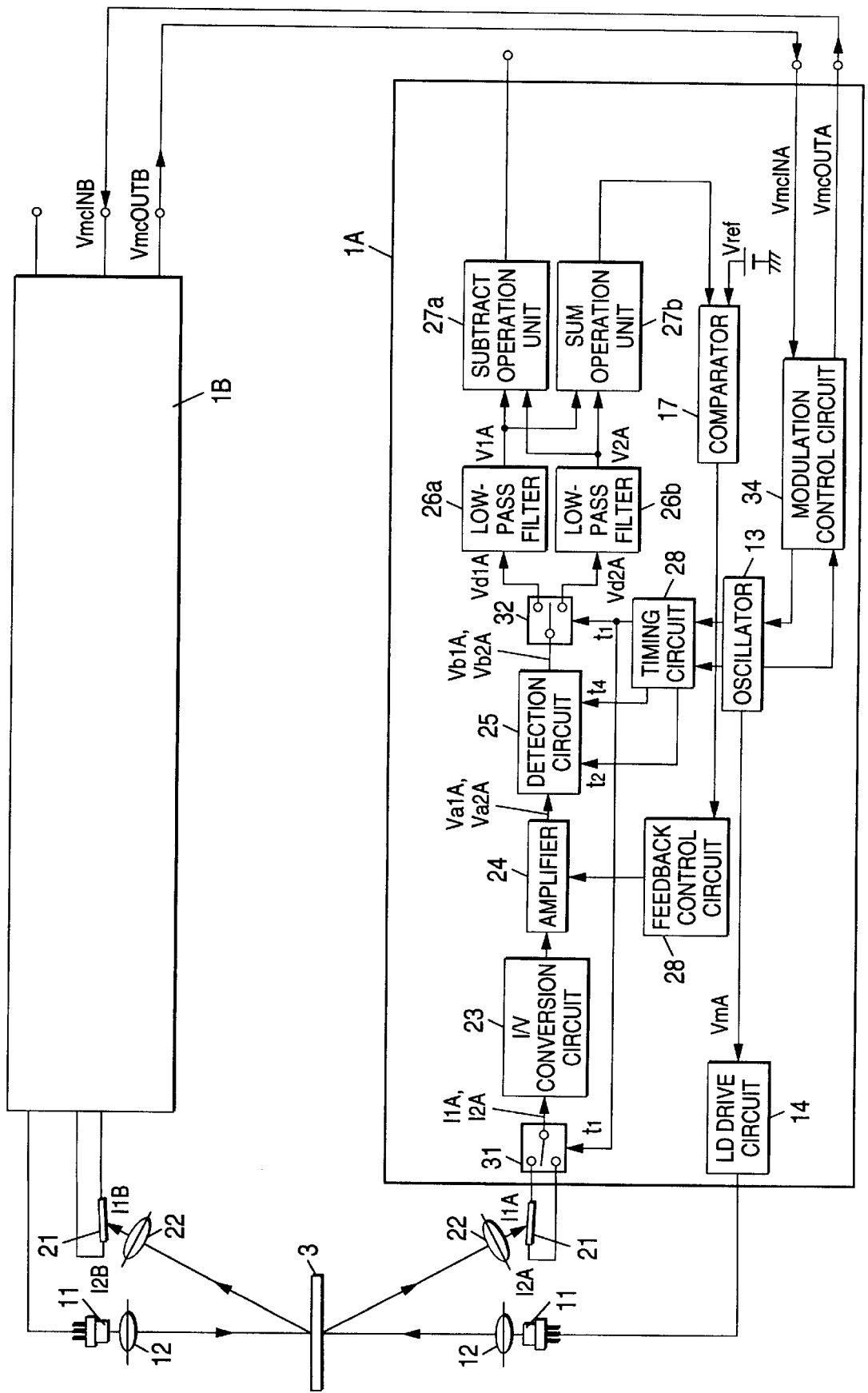
FIG. 23 is a block diagram to show a thirteenth embodiment of the invention.

Like the twelfth embodiment, a thirteenth embodiment of the invention performs feedback control so as to hold the output voltage of a sum calculation section 27b constant, as shown in FIG. 23. It uses a variable amplifier 24' having a variable amplification factor in place of an amplifier 24 and a feedback control circuit 16 is used to change the amplification factor of the variable amplifier 24' rather than light output of a laser diode 11. The output of the sum calculation section 27b can be held at a constant value by the feedback control, so that output of a difference calculation section 27a can be used as a distance measurement value. Other components and operation of the thirteenth embodiment are similar to those of the first embodiment.

Fourteenth Embodiment

Figure 24:
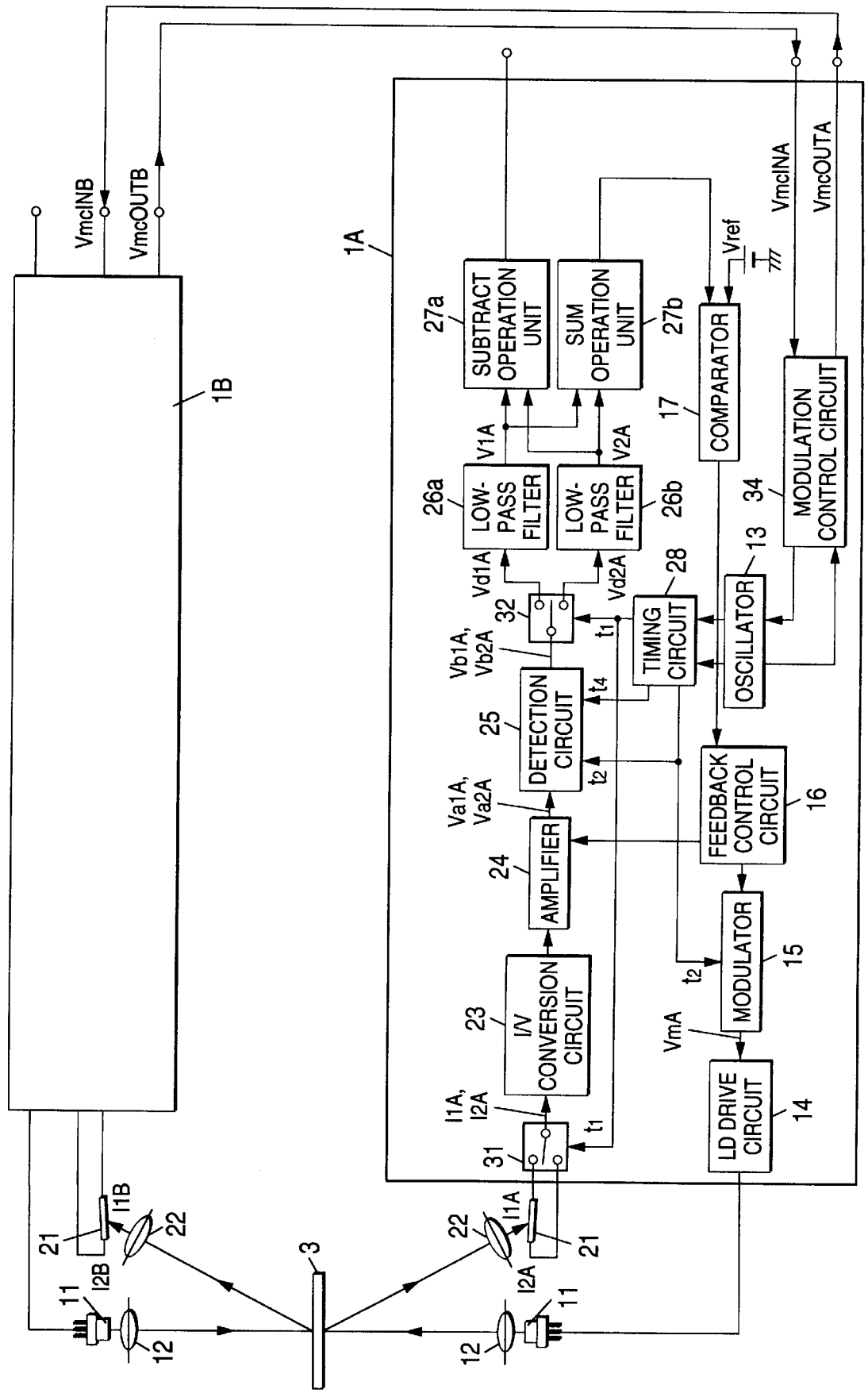
FIG. 24 is a block diagram to show a fourteenth embodiment of the invention.

A fourteenth embodiment of the invention is equivalent to a combination of the configurations of the twelfth and thirteenth embodiments, as shown in FIG. 24. That is, feedback control of light output of a laser diode 1 and the amplification factor of a variable amplifier 24' is performed to hold the output voltage of a sum calculation section 27b constant. At this time, the feedback control is performed as follows. The constant received light amount serves as the reference (for example, this amount determines such that the white ceramic lies on reference distance). When the received light amount is greater than the reference value, the feedback effects the reduce of the light power, and when the received light amount is smaller than the reference value, the feedback effects the increase of the amplification factor.

Namely, when the received light amount is greater than the reference value, the amplification factor sets to the minimum value, in other words, in constant condition, so that it is possible to perform the processing under the resolution in the best condition, and to suppress the light power deal with the increment of the received light amount. When the received light amount is smaller than the reference value, the light power sets to the maximum value, in other words, in constant condition, so that it is possible to obtain the maximum received light amount, and to increase the amplification factor deal with the decrease of the received light amount.

As described above, two feedback operations areas are not overlapped from each other so that the received light amount dynamic range becomes in an extremely wide In other words, the range in which the reflection factor of an object 3 can be measured can be taken wider than that in the twelfth or thirteenth embodiment. Other components and operation of the fourteenth embodiment are similar to those of the first embodiment.

Fifteenth Embodiment

Figure 25:
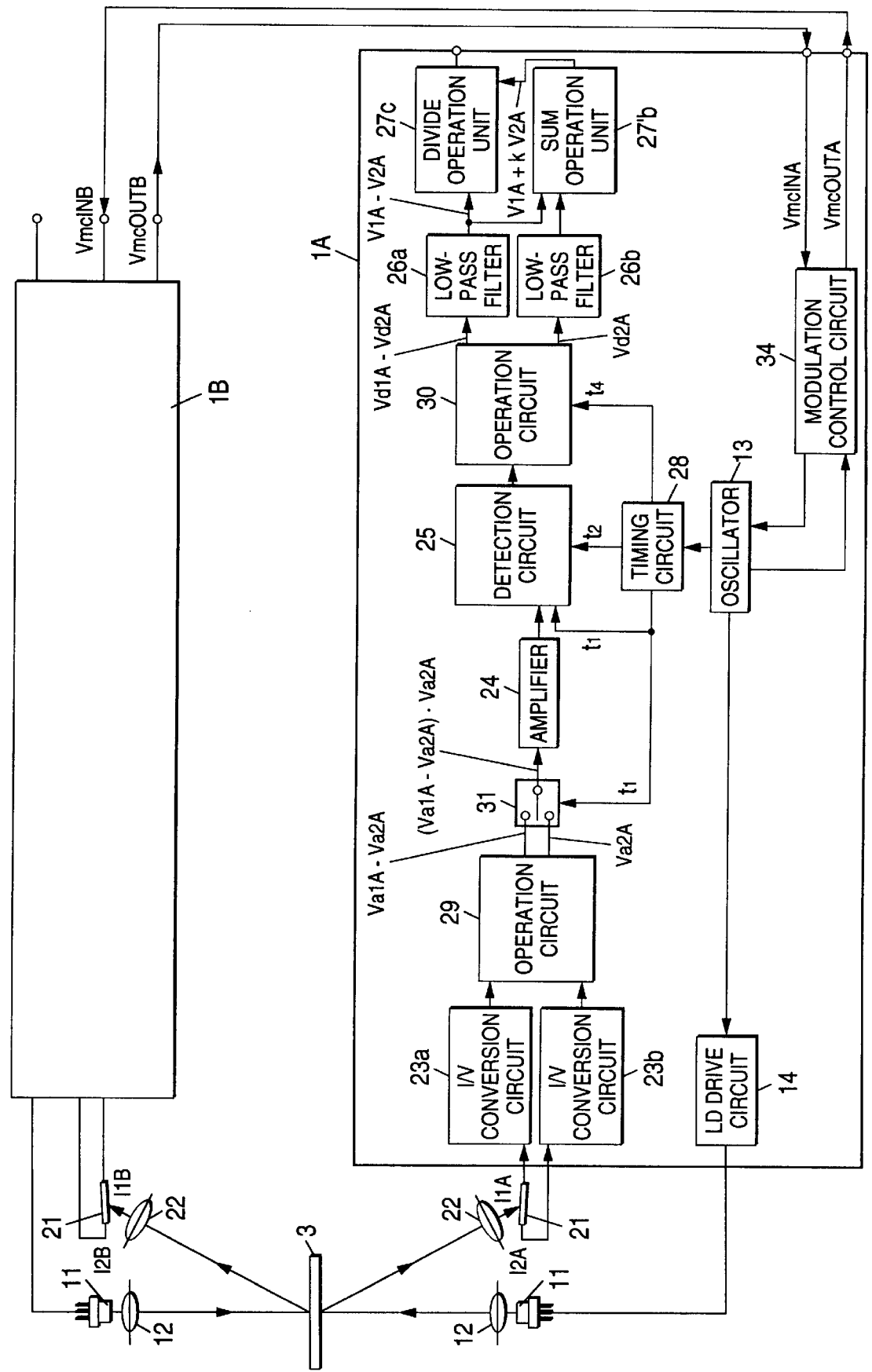
FIG. 25 is a block diagram to show a fifteenth embodiment of the invention.

A fifteenth embodiment of the invention provides a configuration as shown in FIG. 25. The fifteenth embodiment differs from the fifth embodiment in that Va1a–Va2A and Va2A are output from an operation circuit 29, that the switch circuit 32 of the fifth embodiment is not required, that an operation circuit 30 is provided for performing predetermined operation based on output of a detection circuit 25, and that a division section 27c performs the operation (V1A–V2A)/(V1A+kXV2A) where the operation circuit 30 outputs Vd1A–Vd2 and Vd2 and low-pass filters 26a and 26b output V1A–V2A and V2A respectively. An adder 27b' outputs V1A+kXV2A where k is a constant for correcting an optical nonlinear characteristic. Therefore, in the fifteenth embodiment, output of the division section 27c becomes a signal corresponding to the distance to an object by normalizing position signal 11A, 12A output by the position detection element 21 regardless of the sum total of the reflection factor and light reception amount on the surface of the object 3. The embodiment, which does not require the switch circuit 32, can decrease error occurrence caused by a switch operation time delay or caused by switching noise and enhance the distance measurement accuracy as compared with the embodiments provided with the switch circuit 32. Other components and operation of the fifteenth embodiment are similar to those of the fifth embodiment.

Sixteenth Embodiment

Figure 26:
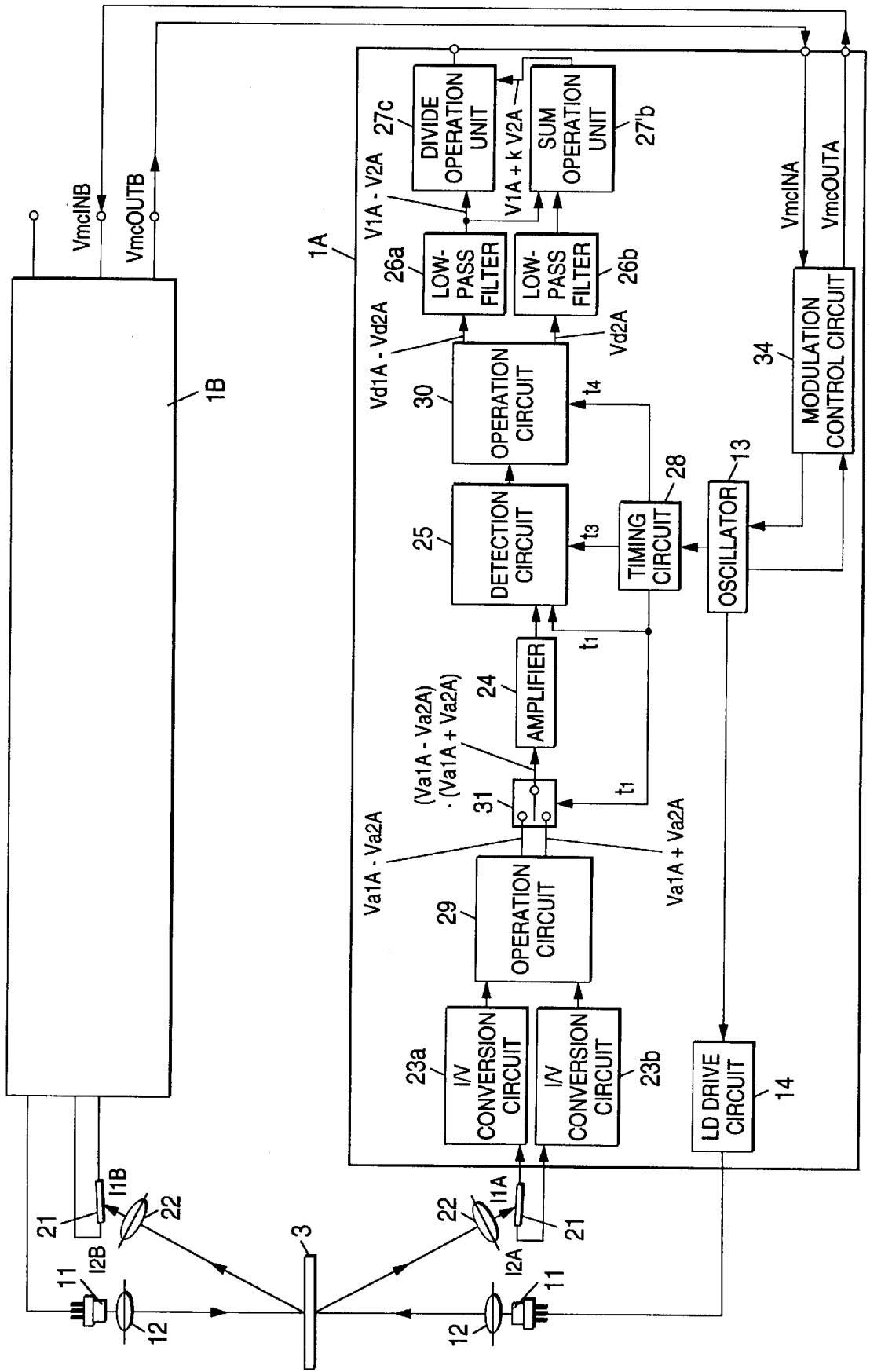
FIG. 26 is a block diagram to show a sixteenth embodiment of the invention.

A sixteenth embodiment of the invention provides a configuration as shown in FIG. 26. The sixteenth embodiment differs from the fifth embodiment in that a different timing signal t3 is given to a detection circuit 25, that the switch circuit 32 of the fifth embodiment is not required, and that a division section 27c performs the operation (V1A–V2A)/(V1A+kXV2A) where low-pass filters 26a and 26b output V1A–V2A and V2A respectively. The timing signal t3 differs from a switch signal t1 in phase about 90 degrees. Other components and operation of the sixteenth embodiment are similar to those of the fifth embodiment.

Seventeenth Embodiment

Figure 27:
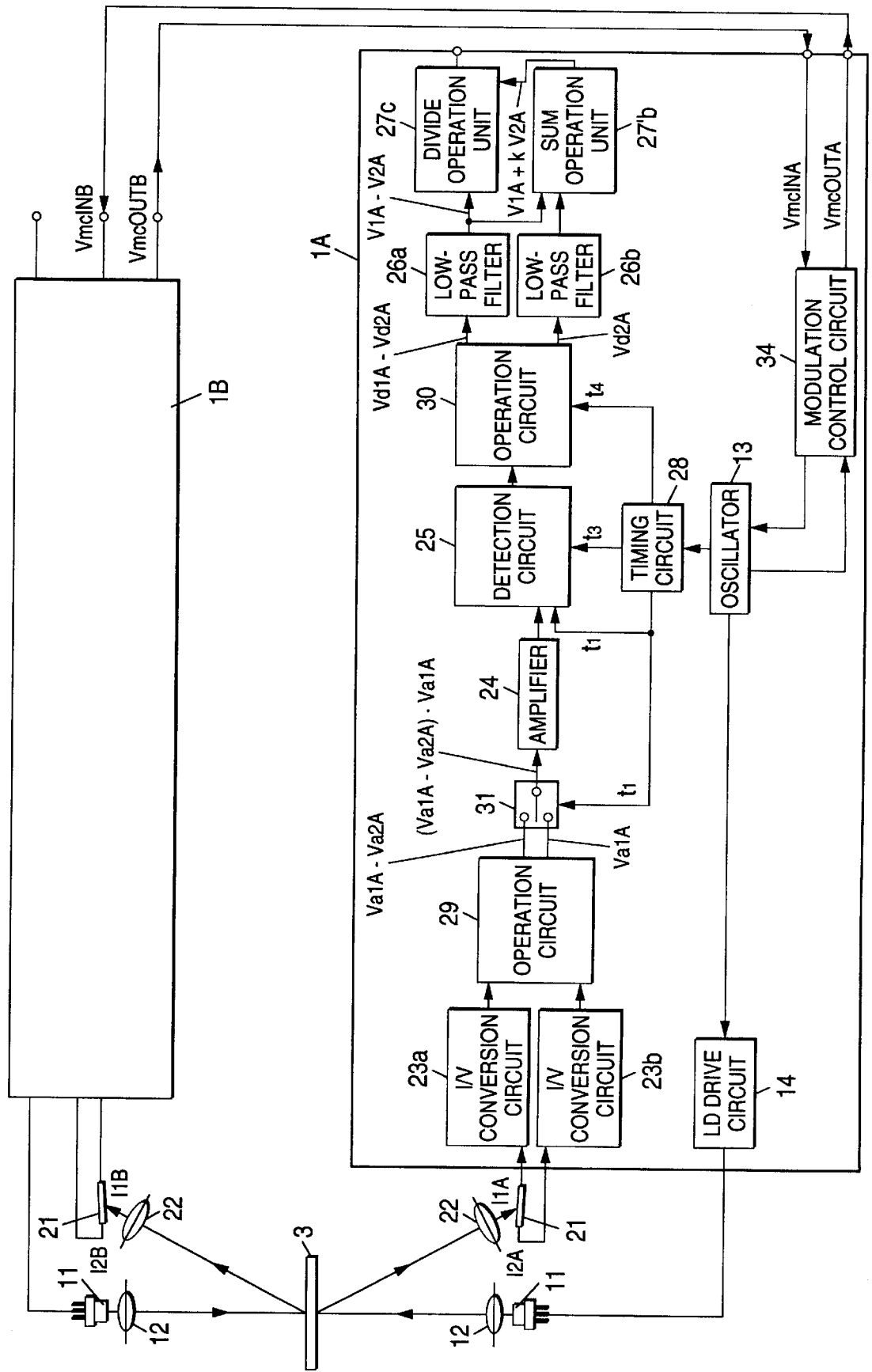
FIG. 27 is a block diagram to show a seventeenth embodiment of the invention.

A seventeenth embodiment of the invention provides a configuration as shown in FIG. 27. The seventeenth embodiment differs from the fifth embodiment in that a different timing signal t3 is given to a detection circuit 25, that the switch circuit 32 of the fifth embodiment is not required, and that a division section 27c performs the operation (V1A–V2A)/(V1A+kXV2A). Other components and operation of the seventeenth embodiment are similar to those of the fifth embodiment.

Eighteenth Embodiment

Figure 28:
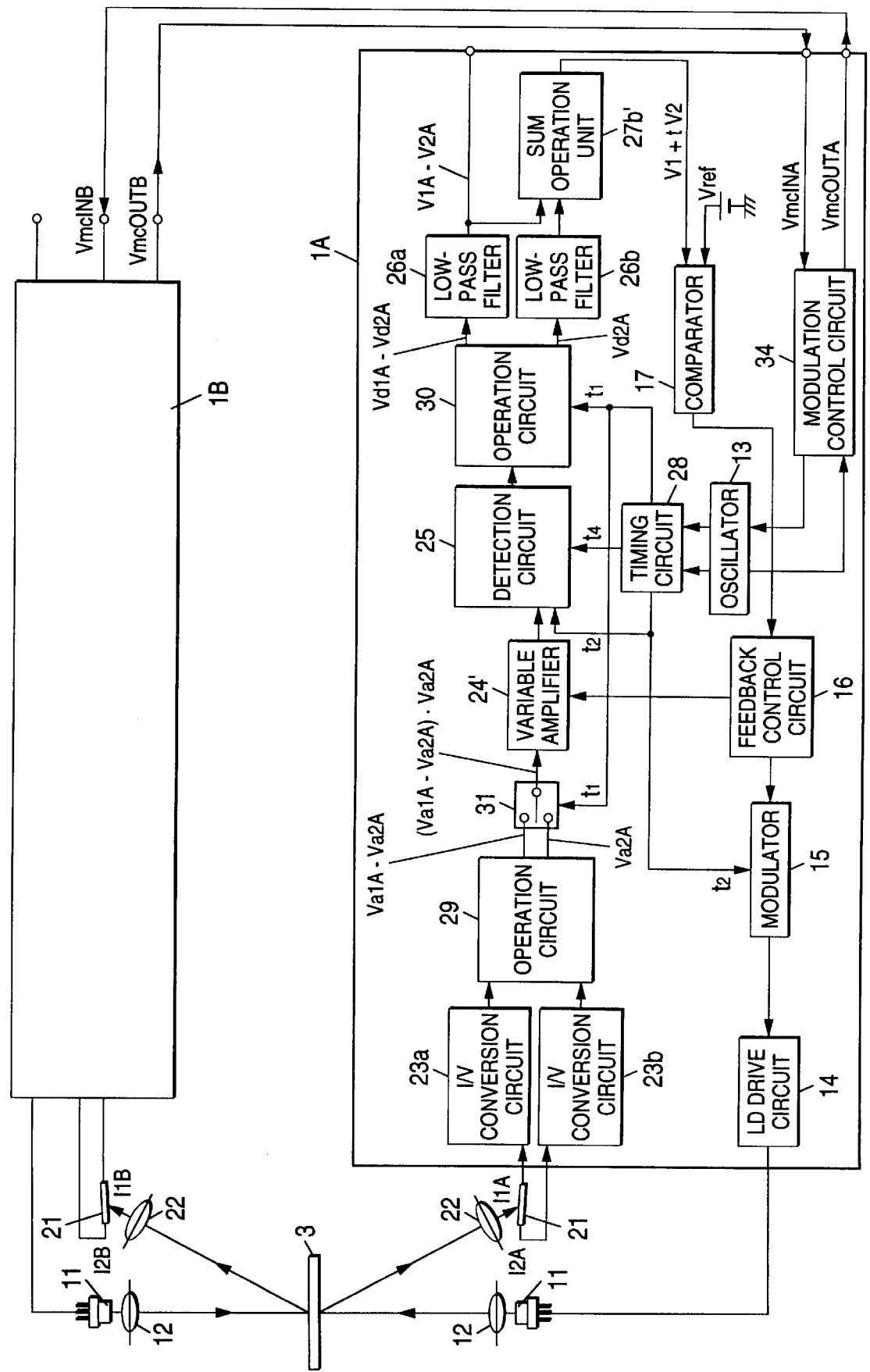
FIG. 28 is a block diagram to show an eighteenth embodiment of the invention.
Figure 29:
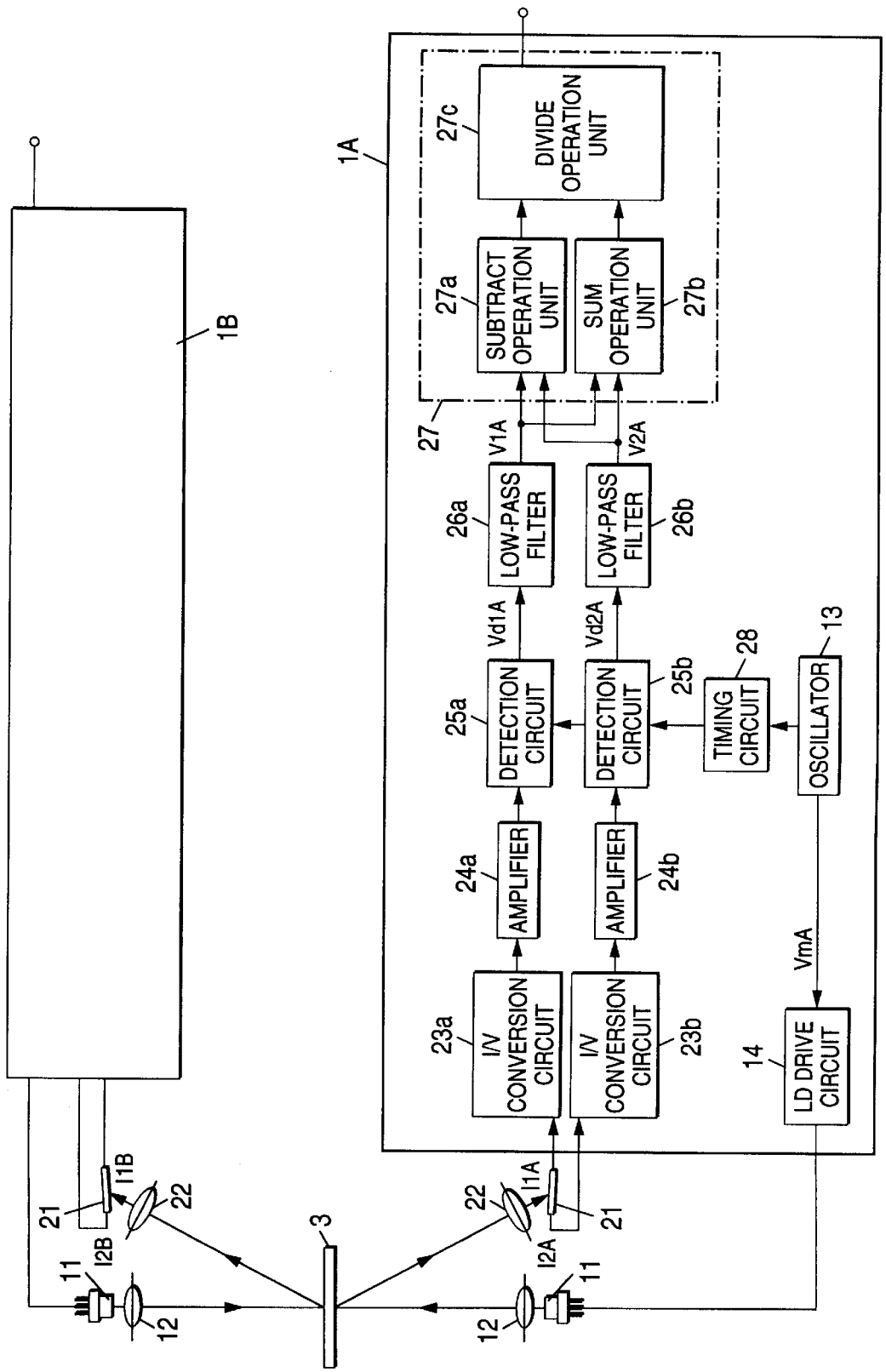
FIG. 29 is a block diagram to show a conventional example.
Figure 30:
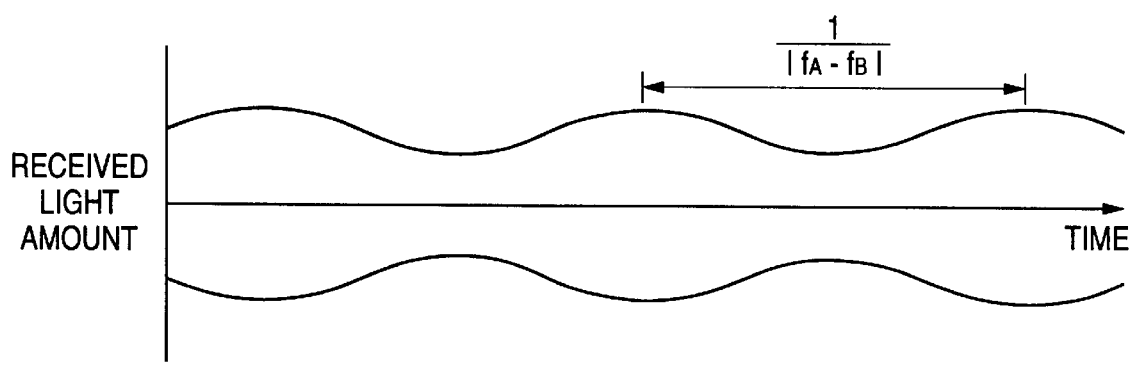
FIG. 30 is an illustration to explain the operation of the conventional example.

By the way, the displacement sensors 1A and 1B of the fifth embodiment comprise each a division section 27c. Displacement sensors 1A and 1B of an eighteenth embodiment of the invention find a distance with no division section 27c, as shown in FIG. 28. The configuration of the eighteenth embodiment operates substantially like that shown as FIG. 9 in Japanese Patent Application No. Hei 8-157680 previously made by the inventor. An output voltage of an adder 27b' (equivalent to the adder 13 in Japanese Patent Application No. Hei 8-157680), V1+kXV2, is assumed to be equivalent to all light amount incident on a position detection element 21 and a comparison circuit 17 compares the output voltage with reference voltage Vref and outputs a signal equivalent to the difference between the output voltage of the adder 27b' and the reference voltage Vref to a feedback control circuit 16. The feedback control circuit 16 executes amplitude modulation with a timing signal t2 from a timing circuit 28 as a carrier through a modulator 15 and drives a laser diode 11 through an LD drive circuit 14. In short, light output of the laser diode 11 undergoes feedback control in response to the received light amount at the positioin detection element 11. Further, a variable amplifier 24' having a variable amplification factor is used in place of the amplifier 24 in the fifth embodiment and the amplification factor of the variable amplifier 24' is changed by the feedback control circuit 16. That is, in the eighteenth embodiment like the fourteenth embodiment, feedback control of the light output of the laser diode 11 and the amplification factor of the variable amplifier 24' is performed. A value found as the output voltage of the adder 27b', V1+kXV2, results.

If the configuration is adopted, the output of the adder 27b' is held at the reference voltage Vref as a constant value and the denominator when a distance finding operation is performed becomes a constant value, thus outputt of a low-pass filter 26a, V1A–V2A, becomes equivalent to the distance to an object 3. This eliminates the need for the division section 27c. Moreover, the light output of the laser diode 11 can be adjusted in response to the received light amount at the position detection element 21, so that the light amount can be adjusted in response to the reflection factor or distance of the object 3 and the distance can be measured accurately in the dynamic range of the processing circuit. Other components and operation of the eighteenth embodiment are similar to those of the fifth embodiment.

According to the present invention, an optical displacement measurement device is provided for irradiating an object with beam light modulated in an appropriate cycle from a light emitting element, forming a light transmission spot on the surface of the object, forming an image of the light transmission spot on a light reception face of a position detection element, thereby providing a light reception spot, and finding a distance to the object based on a position of the light reception spot by a processing section, the optical displacement measurement device comprising a modulation control circuit for irradiating the object with beam light as many times as appropriate in the cycle for performing distance measurement operation, then stopping the distance measurement operation and generating modulation control output indicating the operation stop, and upon reception of modulation control input indicating the operation start from the outside, again starting the distance measurement operation. For example, if two optical displacement measurement devices are placed in a positional relationship in which it is feared that the optical displacement measurement devices may interfere with each other, the modulation control output of one of the optical displacement measurement devices is given as the modulation control input of the other, thereby enabling both the optical displacement measurement devices to be operated alternately. Resultantly, the advantage of being capable of preventing mutual interference is offered. This means that two sensors can be made adjacent to each other or be opposed to each other for use without degrading resolution or linearity caused by interference.

As in the present invention, the optical displacement measurement devicestarts to emit the beam light upon reception of the modulation control input from the outside as an instruction to start the distance measurement operation and uses output of the position detection element to find the distance to the object after the expiration of a predetermined time interval required for the started operation to become stable, or as in the present invention, the number of times the beam light is emitted between reception of the distance measurement operation start instruction and stopping of the operation is set to the number of times to a degree that an average error value of distance measurement in a period during which the operation is unstable just after the operation starts can be ignored. Thus, distance measurement can be executed so that a measurement error scarcely occurs even if the time interval between reception of the distance measurement operation start instruction as the modulation control input and the distance measurement operation becoming stable is long, namely, responsivity is poor.

As in the present invention, the optical displacement measurement device further includes a switch element being inserted between the position detection element and the processing section for inhibiting input of output of the position detection element to the processing section while the distance measurement operation is stopped upon reception of the modulation control input from the outside. Thus, if strong disturbance light is incident on the device while the distance measurement operation is stopped, it is not input to the processing section, so that saturation or nonlinear operation of the processing section can be avoided and the distance measurement accuracy is raised.

As in the present invention, the modulation control circuit outputs either of two voltages as the modulation control output, wherein a first threshold value outside the range of the two voltages and a second threshold value within the range of the two voltages are set for comparison with the modulation control input. When the modulation control input is within the range of the two voltages with respect to the first threshold value, the modulation control circuit determines stopping or restarting of the distance measurement operation in response to greater-than or less-than relation between the second threshold value and the modulation control input, and if the modulation control input from the outside does not exist, the modulation control circuit sets opposed voltage to the two voltages with respect to the first threshold value as the modulation control input for continuing the distance measurement operation without interrupt. Thus, the single use mode or the use mode to prevent mutual interference can be selected simply in response to the connection form to the modulation control circuit and moreover such a function can be provided as a small size at low costs and the ease-of-use can be improved.

As in the present invention, the processing section comprises a feedback control circuit for performing feedback control of light output of the light emitting element so as to hold a light reception amount almost constant at the position detection element, the processing section comprises a variable amplifier having a variable amplification factor for amplifying the position signals output from the position detection element and a feedback control circuit for performing feedback control of the amplification factor of the variable amplifier so that the addition value of output values after the paired position signals are amplified by the variable amplifier becomes almost constant, the processing section comprises a variable amplifier having a variable amplification factor for amplifying the position signals output from the position detection element and a feedback control circuit for performing feedback control of light output of the light emitting element so as to hold a light reception amount almost constant at the position detection element and feedback control of the amplification factor of the variable amplifier so that the addition value of output values after the paired position signals are amplified by the variable amplifier becomes almost constant. Thus, the range in which the objects different in reflection factor can be measured widens and various objects can be covered.

As in the present invention, an optical displacement measurement system is provided which uses a plurality of optical displacement measurement device of the present invnetion, classifies the optical displacement measurement devices into two groups interfering each other, and connects modulation control inputs and modulation control outputs of the optical displacement measurement devices making up each group in common for directing modulation control output of one group to modulation control input of another group. Thus, a plurality of the optical displacement measurement devices are classified into two groups and interference between the groups can be prevented.

As in the present invention, in optical displacement measurement device, the modulation control circuit starts the distance measurement operation based on either of rising and falling edges of an input signal to modulation control input from the outside and the optical displacement measurement devices are connected in order like a ring so as to direct each modulation control output to each modulation control input. Thus, it is made possible to use as many optical displacement measurement devices as necessary without interfering with each other.

As in the present invention, the position detection element outputs a pair of position signals having a signal value ratio determined in response to the light reception spot position and the processing section comprises a first switch circuit for changing the position signals every cycles of an integer multiple of the beam light modulation cycle for selectively outputting either of the signals, synchronous detection means for detecting the output signal of the first switch circuit in synchronization with the beam light modulation cycle, a second switch circuit for separating an output signal of the synchronous detection means into a pair of signals in synchronization with the first switch circuit, and an operation section for calculating a displacement from a reference position of the object based on output of the second switch circuit. Thus, an error caused by constant variations or temperature characteristic variations of the components as in the conventional processing section using two channels of circuitry for the position signals does not occur and moreover the same synchronous detection means synchronously detects the two position signals, so that an offset error does not occur either. Further, since the single circuit processes the two position signals, a frequency characteristic difference is not produced until the signal is separated by the second switch circuit, and if the modulation frequency of the signal for driving the light emitting element changes, a transient error does not occur in the distance measurement result.

As in the present invention, the position detection element outputs a pair of position signals having a signal value ratio determined in response to the light reception spot position and the processing section comprises a first operation section for performing subtraction and addition operations on the position signals and outputting the resulting signals, a first switch circuit for changing the output signals of the first operation section every cycles of an integer multiple of the beam light modulation cycle for selectively outputting either of the signals, synchronous detection means for detecting the output signal of the first switch circuit in synchronization with the beam light modulation cycle, a second switch circuit for separating an output signal of the synchronous detection means into a pair of signals in synchronization with the first switch circuit, and a second operation section for calculating a displacement from a reference position of the object based on output of the second switch circuit. Since the first operation section performs subtraction operation on the position signals, if the position signals contain in-phase noise, the first operation section can remove the in-phase noise for suppressing occurrence of a distance measurement error or degradation of resolution otherwise caused by the effect of the in-phase noise of the position signals.

As in the present invention, the position detection element outputs a pair of position signals having a signal value ratio determined in response to the light reception spot position and the processing section comprises a first operation section for performing subtraction and addition operations on the position signals and outputting the resulting signals, a switch circuit for changing the output signals of the first operation section every cycles of an integer multiple of the beam light modulation cycle for selectively outputting either of the signals, synchronous detection means for detecting the output signal of the switch circuit in synchronization with the beam light modulation cycle, and a second operation section for correcting an optical nonlinear characteristic based on an output signal of the synchronous detection means and calculating a displacement from a reference position of the object. Since the first operation section performs subtraction operation on the position signals, if the position signals contain in-phase noise, the operation section can remove the in-phase noise for suppressing occurrence of a distance measurement error or degradation of resolution otherwise caused by the effect of the in-phase noise of the position signals. Since the number of switch circuits is fewer than that in the present invention, occurrence of a time delay error of the switch operation and occurrence of a switching noise error can be decreased and the distance measurement accuracy can be raised.

As in the present invention, the position detection element outputs a pair of position signals having a signal value ratio determined in response to the light reception spot position and the processing section comprises a first operation section for subtracting the other position signal from one position signal output from the position detection element and outputting a subtraction result signal and the other position signal, a switch circuit for changing the output signals of the first operation section every cycles of an integer multiple of the beam light modulation cycle for selectively outputting either of the signals, synchronous detection means for detecting the output signal of the switch circuit in synchronization with the beam light modulation cycle, and a second operation section for correcting an optical nonlinear characteristic based on an output signal of the synchronous detection means and calculating a displacement from a reference position of the object. Since the first operation section performs subtraction operation on the position signals, if the position signals contain in-phase noise, the operation section can remove the in-phase noise for suppressing occurrence of a distance measurement error or degradation of resolution otherwise caused by the effect of the in-phase noise of the position signals. Since the number of switch circuits is fewer than that in the present invention, occurrence of a time delay error of the switch operation and occurrence of a switching noise error can be decreased and the distance measurement accuracy can be raised.

As in the present invention, the position detection element outputs a pair of position signals having a signal value ratio determined in response to the light reception spot position and the processing section comprises a first operation section for subtracting the other position signal from one position signal output from the position detection element and outputting a subtraction result signal and the one position signal, a switch circuit for changing the output signals of the first operation section every cycles of an integer multiple of the beam light modulation cycle for selectively outputting either of the signals, synchronous detection means for detecting the output signal of the switch circuit in synchronization with the beam light modulation cycle, and a second operation section for correcting an optical nonlinear characteristic based on an output signal of the synchronous detection means and calculating a displacement from a reference position of the object. Since the first operation section performs subtraction operation on the position signals, if the position signals contain in-phase noise, the operation section can remove the in-phase noise for suppressing occurrence of a distance measurement error or degradation of resolution otherwise caused by the effect of the in-phase noise of the position signals. Since the number of switch circuits is fewer than that in the present invention, occurrence of a time delay error of the switch operation and occurrence of a switching noise error can be decreased and the distance measurement accuracy can be raised.

What is claimed is:

1. An optical displacement measurement device for irradiating an object with beam light modulated in an appropriate cycle from a light emitting element, forming a light transmission spot on a surface of the object, forming an image of the light transmission spot on a light reception face of a position detection element, thereby providing a light reception spot, and finding a distance to the object based on a position of the light reception spot by a processing section, said optical displacement measurement device including a modulation control circuit for irradiating the object with beam light as many times as appropriate in the cycle for performing distance measurement operation, then stopping the distance measurement operation and generating modulation control output indicating the operation stop, upon reception of modulation control input indicating operation start from an outside, again starting the distance measurement operation.

2. The displacement measurement device as claimed in claim 1 further comprising:

starting to emit the beam light upon reception of the modulation control input including an instruction to start the distance measurement operation; and using output of the position detection element to find the distance to the object after the expiration of a predetermined time interval.

3. The displacement measurement device as claimed in claim 1, wherein the number of times the beam light which is emitted between reception of the distance measurement operation start instruction and stopping of the operation is set to the number of times such that an average error value of distance measurement in a period during which the operation is unstable just after the operation starts can be ignored.

4. The displacement measurement device as claimed in claim 1, further comprising:

a switch element inserted between the position detection element and the processing section for inhibiting input of output of the position detection element to the processing section while the distance measurement operation is stopped upon reception of the modulation control input.

5. The displacement measurement device as claimed in claim 1, wherein the modulation control output is selected from one of two voltages, a first threshold value outside the range of the two voltages and a second threshold value within the range of the two voltages are set for comparison with the modulation control input, and wherein when the modulation control input is within a side in the range of the two level voltages with respect to the first threshold value, the distance measurement operation is stopped or restarted in response to the relation between the second threshold value and the modulation control input, and wherein if the modulation control input does not exist, a voltage within an opposed side of the two voltages with respect to the first threshold value sets as the modulation control input for continuing the distance measurement operation without interrupt.

6. The displacement measurement device as claimed in claim 1, wherein said processing section includes a feedback control circuit for performing feedback control of light output of the light emitting element so as to hold a light reception amount almost constant at the position detection element.

7. The displacement measurement device as claimed in claim 1, wherein said position detection element outputs a pair of position signals having a signal value ratio determined in response to the light reception spot position, and wherein said processing section includes a variable amplifier having a variable amplification factor for amplifying the position signals output from said position detection element and a feedback control circuit for performing feedback control of the amplification factor of said variable amplifier so that an addition value of output values after the paired position signals which are amplified by said variable amplifier becomes almost constant.

8. The displacement measurement device as claimed in claim 1, wherein said position detection element outputs a pair of position signals having a signal value ratio determined in response to the light reception spot position and, wherein said processing section includes a variable amplifier having a variable amplification factor for amplifying the position signals output from said position detection element and a feedback control circuit for performing feedback control of light output of the light emitting element so as to hold a light reception amount almost constant at said position detection element and feedback control of the amplification factor of said variable amplifier so that an addition value of output values after the paired position signals which are amplified by said variable amplifier becomes almost constant.

9. An optical displacement measurement system comprising:
    a plurality of optical displacement measurement devices as claimed in claim 1,
    wherein, said optical displacement measurement device are classified into two groups interfering each other, and connecting modulation control inputs and modulation control outputs of said optical displacement measurement devices making up each group in common for directing modulation control output of one group to modulation control input of another group.

10. An optical displacement measurement system comprising:
    a plurality of optical displacement measurement devices as claimed in claim 1,
    wherein said modulation control circuit starts the distance measurement operation based on either of rising and falling edges of an input signal to modulation control input from the outside and wherein said plurality of optical displacement measurement devices are connected in order like a ring so as to direct each modulation control output to each modulation control input.

11. An optical displacement measurement device comprising:
    a light emitting element for irradiating an object with beam light modulated in an appropriate cycle to form a light transmission spot on a surface of the object so as to obtain a light reception spot position on a surface of the light emitting element;
    a position detection element outputting a pair of position signals having a signal value ratio determined in response to a light reception spot position;
    a processing device including:
    a first switch circuit for changing the position signals every cycles of an integer multiple of the beam light modulation cycle and for selectively outputting either of the signals,
    synchronous detection means for detecting the output signal of said first switch circuit in synchronization with the beam light modulation cycle,
    a second switch circuit for separating an output signal of said synchronous detection means into a pair of signals in synchronization with said first switch circuit, and
    an operation section for calculating a displacement from a reference position of the object based on output of said second switch circuit; and
    a modulation control circuit for irradiating the object with beam light as many times as appropriate in the cycle for performing distance measurement operation to stop the distance measurement operation and to generate modulation control output indicating the operation stop, and for starting the distance measurement operation, again upon reception of modulation control input indicating operation start from an outside.

12. The displacement measurement device as claimed in claim 11, wherein said processing section includes a feedback control circuit for performing feedback control of light output of the light emitting element so as to hold a light reception amount almost constant at the position detection element.

13. The displacement measurement device as claimed in claim 11, wherein said position detection element outputs a pair of position signals having a signal value ratio determined in response to the light reception spot position, and wherein said processing section includes a variable amplifier having a variable amplification factor for amplifying the position signals output from said position detection element and a feedback control circuit for performing feedback control of the amplification factor of said variable amplifier so that an addition value of output values after the paired position signals which are amplified by said variable amplifier becomes almost constant.

14. The displacement measurement device as claimed in claim 11, wherein said position detection element outputs a pair of position signals having a signal value ratio determined in response to the light reception spot position and, wherein said processing section includes a variable amplifier having a variable amplification factor for amplifying the position signals output from said position detection element and a feedback control circuit for performing feedback control of light output of the light emitting element so as to hold a light reception amount almost constant at said position detection element and feedback control of the amplification factor of said variable amplifier so that an addition value of output values after the paired position signals which are amplified by said variable amplifier becomes almost constant.

15. The optical displacement measurement device comprising:
    a light emitting element for irradiating an object with beam light modulated in an appropriate cycle to form a light transmission spot on a surface of the object so as to obtain a light reception spot position on a surface of the light emitting element;
    position detection element outputs a pair of position signals having a signal value ratio determined in response to the light reception spot position;
    processing device including:
    a first operation section for performing subtraction and addition operations on the position signals and outputting the resulting signals;

a first switch circuit for changing the output signals of said first operation section every cycles of an integer multiple of the beam light modulation cycle, and for selectively outputting either of the signals;

synchronous detection means for detecting the output signal of said first switch circuit in synchronization with the beam light modulation cycle;

a second switch circuit for separating an output signal of said synchronous detection means into a pair of signals in synchronization with said first switch circuit;

a second operation section for calculating a displacement from a reference position of the object based on output of said second switch circuit; and a modulation control circuit for irradiating the object with beam light as many times as appropriate in the cycle for performing distance measurement operation to stop the distance measurement operation and to generate modulation control output indicating the operation stop, and for starting the distance measurement operation, again upon reception of modulation control input indicating operation start from an outside.

16. The optical displacement measurement device comprising:

a light emitting element for irradiating an object with beam light modulated in an appropriate cycle to form a light transmission spot on a surface of the object so as to obtain a light reception spot position on a surface of the light emitting element;

position detection element outputs a pair of position signals having a signal value ratio determined in response to the light reception spot position;

processing device including:

a first operation section for performing subtraction and addition operations on the position signals and outputting the resulting signals;

a switch circuit for changing the output signals of said first operation section every cycles of an integer multiple of the beam light modulation cycle, and for selectively outputting either of the signals;

synchronous detection means for detecting the output signal of said switch circuit in synchronization with the beam light modulation cycle;

a second operation section for correcting an optical nonlinear characteristic based on an output signal of said synchronous detection means and calculating a displacement from a reference position of the object; and a modulation control circuit for irradiating the object with beam light as many times as appropriate in the cycle for performing distance measurement operation to stop the distance measurement operation and to generate modulation control output indicating the operation stop, and for starting the distance measurement operation, again upon reception of modulation control input indicating operation start from an outside.

17. The optical displacement measurement device as claimed in claim 16, wherein said first operation section subtracts the other position signal from one position signal output from said position detection element and outputs a subtraction result signal and the other position signal.

18. The optical displacement measurement device as claimed in claim 16, wherein said first operation section subtracts the other position signal from one position signal output from said position detection element and outputs a subtraction result signal and the one position signal.

19. A method for measuring a displacement comprising the steps of:

irradiating an object with beam light modulated in an appropriate cycle from a light emitting element;

forming a light transmission spot on a surface of said object;

forming an image of said light transmission spot on a light reception face of a position detection element;

providing a light reception spot;

finding a distance to the object based on a position of said light reception spot by a processing section;

irradiating the object with beam light as many times as appropriate in the cycle for performing distance measurement operation;

stopping the distance measurement operation;

generating modulation control output indicating the operation stop;

starting the distance measurement operation upon reception of modulation control input indicating operation start.

* * * * *